Feb. 8, 1944.  C. O. MARSHALL ET AL  2,341,226
WEIGHING SCALE
Filed April 24, 1942   11 Sheets-Sheet 4
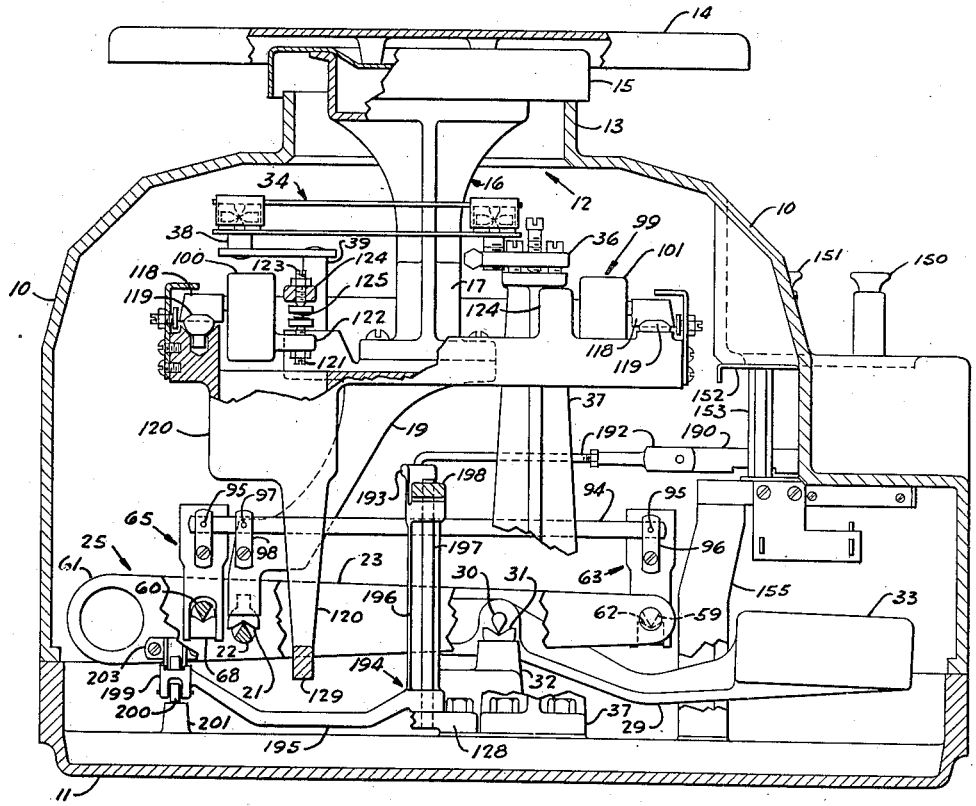
Fig. VII
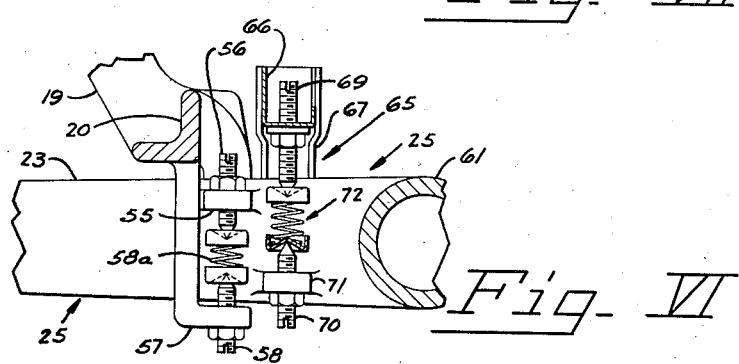
Fig. VI
Charles O. Marshall
Lawrence S. Williams
INVENTORS
BY Marshall & Marshall
ATTORNEYS

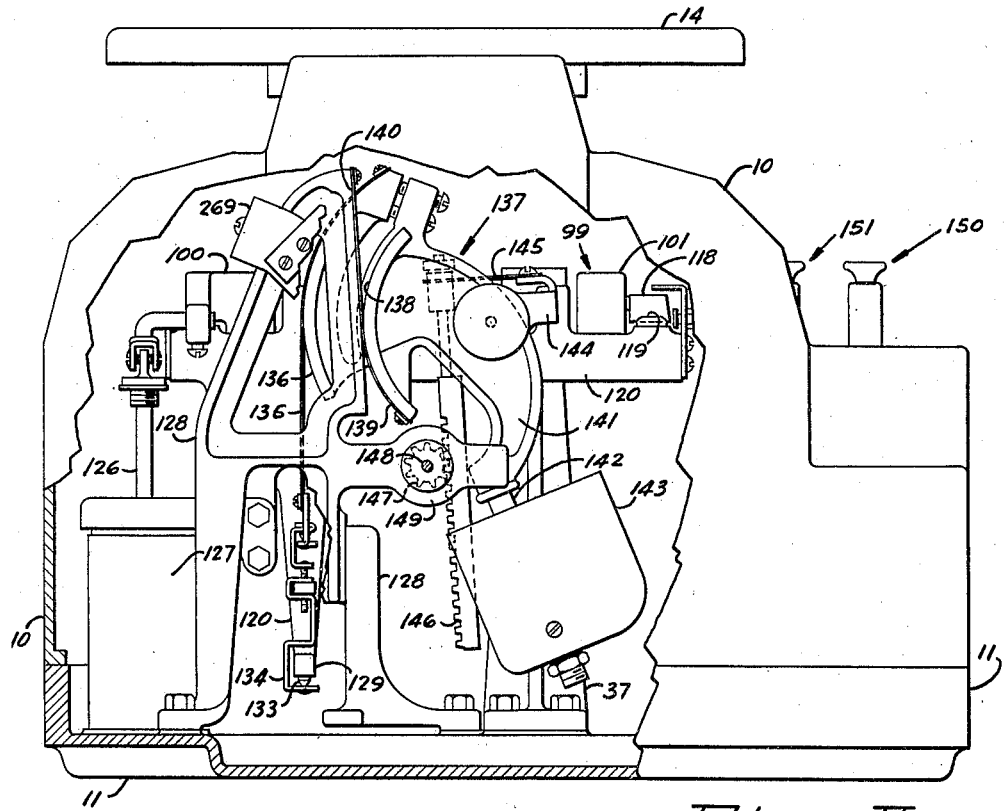

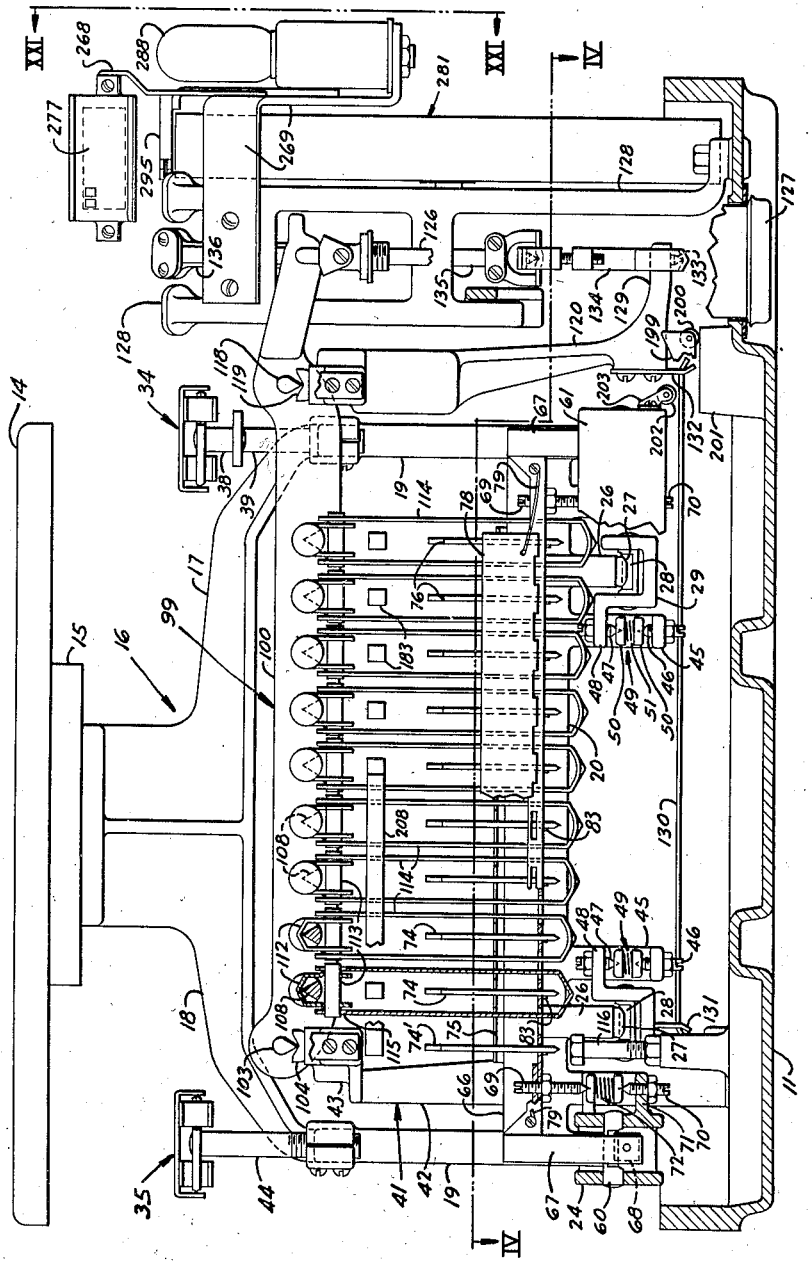

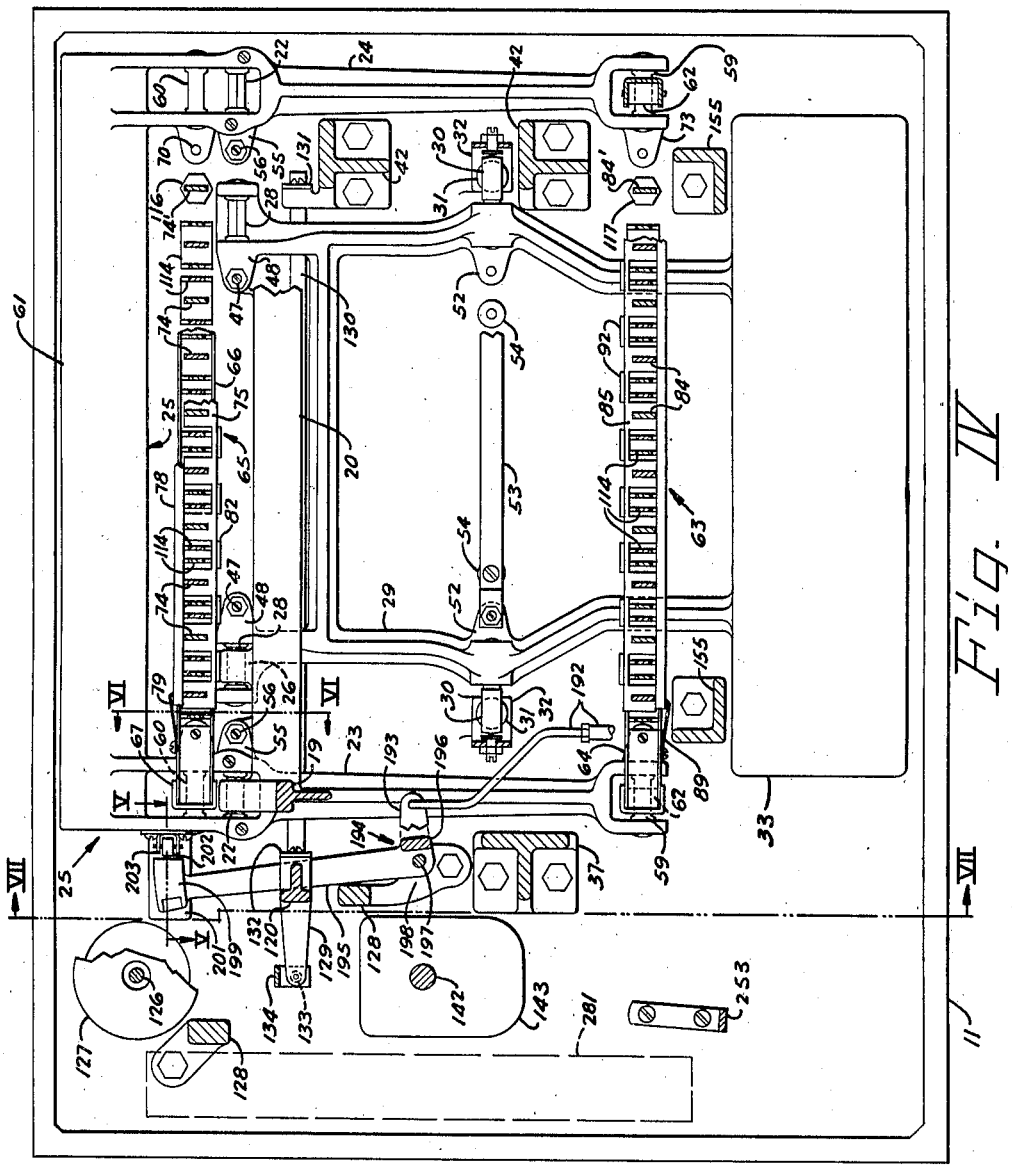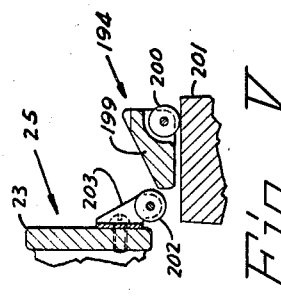

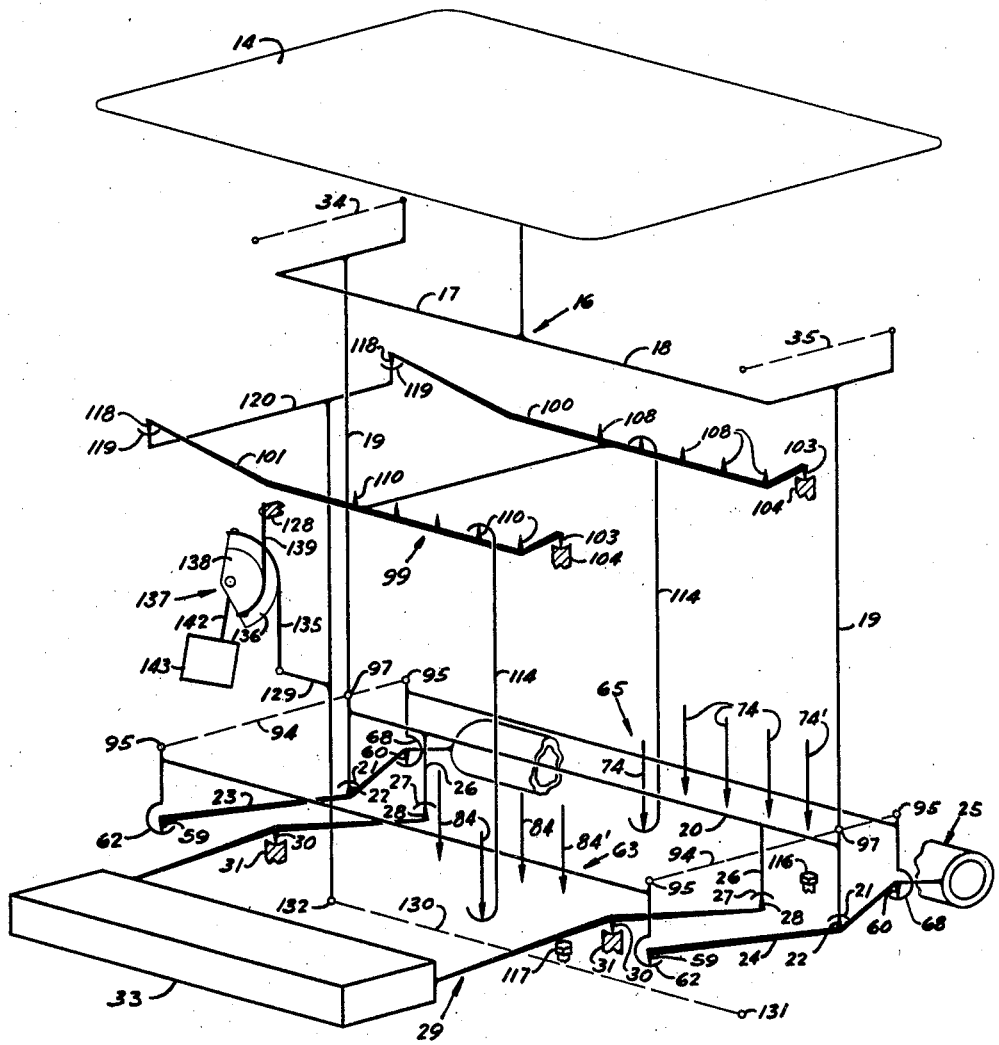
Fig. VIII

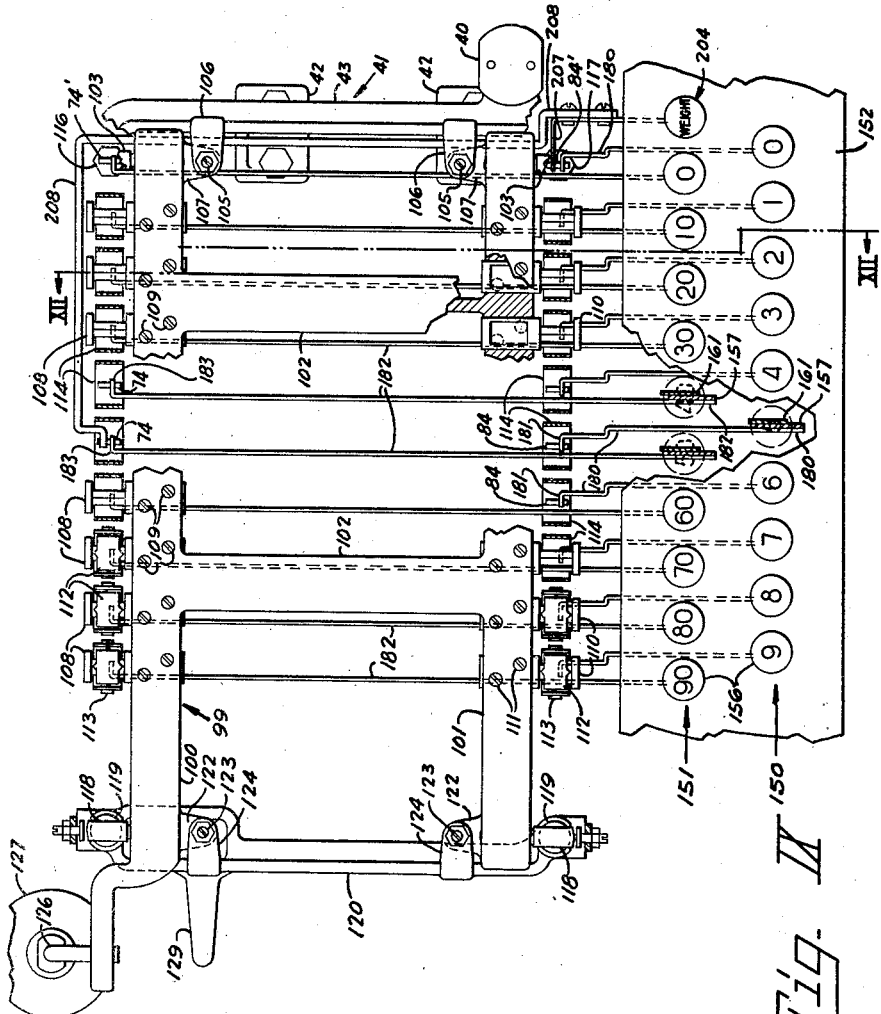

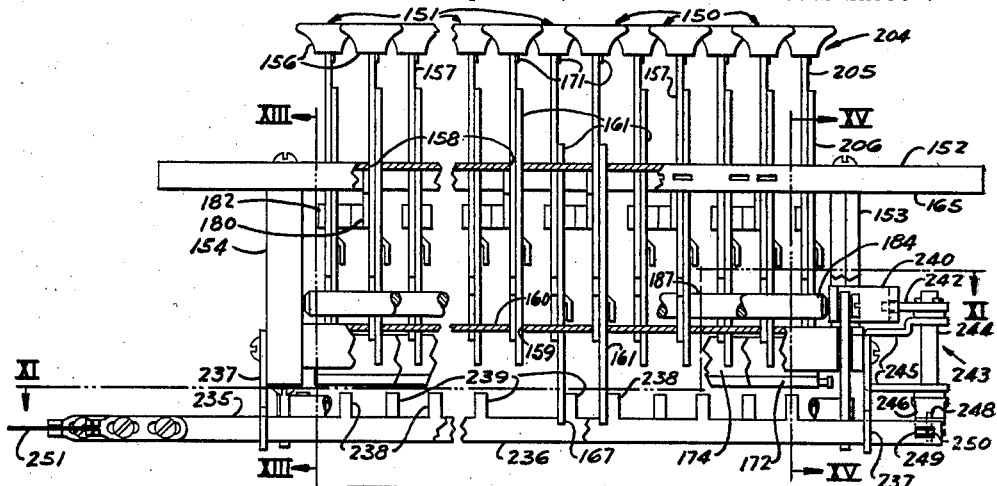

Feb. 8, 1944. C. O. MARSHALL ET AL 2,341,226
WEIGHING SCALE
Filed April 24, 1942 11 Sheets-Sheet 8
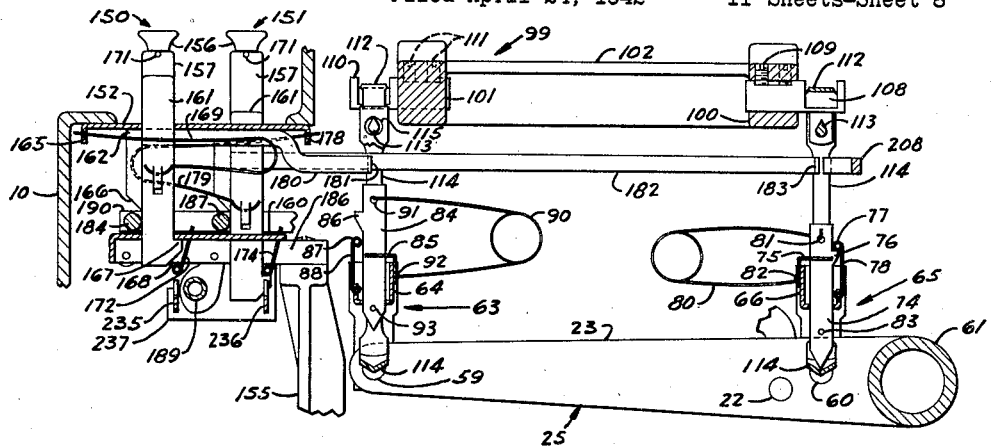
Fig. XII
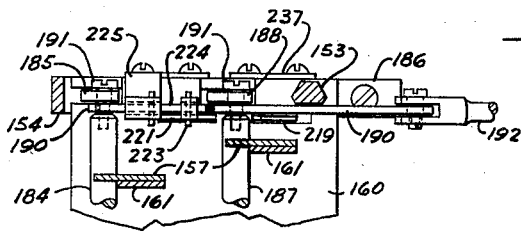
Fig. XIV
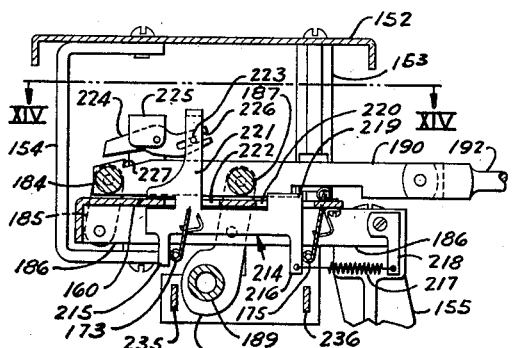
Fig. XIII
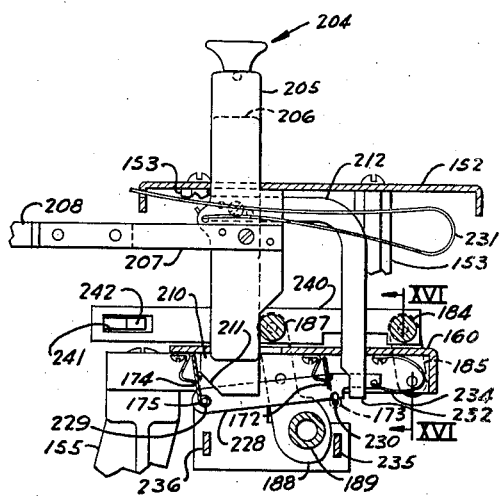
Fig. XV
Fig. XVI
Charles O. Marshall
Lawrence S. Williams
INVENTORS
BY Marshall & Marshall
ATTORNEYS Feb. 8, 1944.   C. O. MARSHALL ET AL   2,341,226
WEIGHING SCALE
Filed April 24, 1942   11 Sheets-Sheet 9
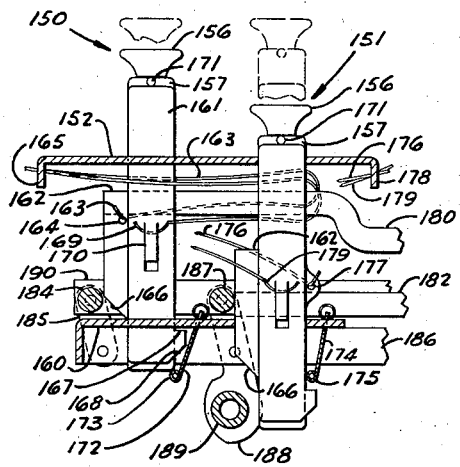
Fig. XVII
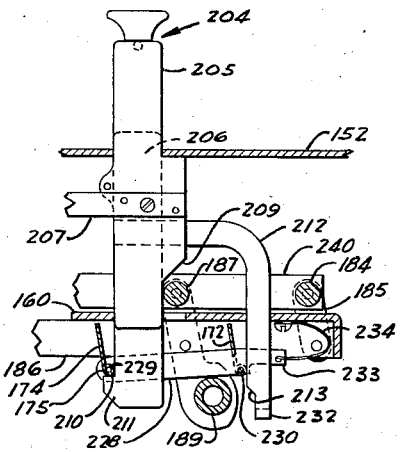
Fig. XVIII
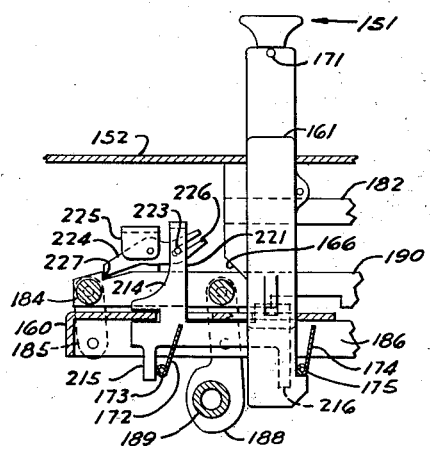
Fig. XIX
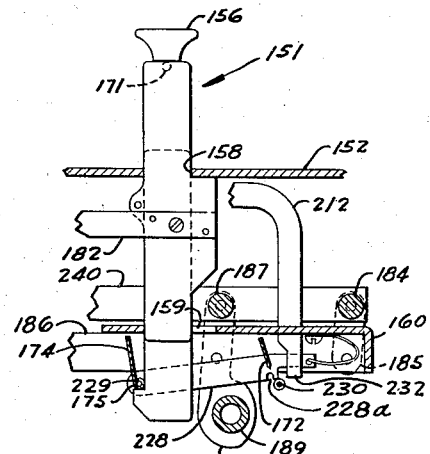
Fig. XX
Charles O. Marshall
Lawrence S. Williams
INVENTORS
BY Marshall and Marshall
ATTORNEYS

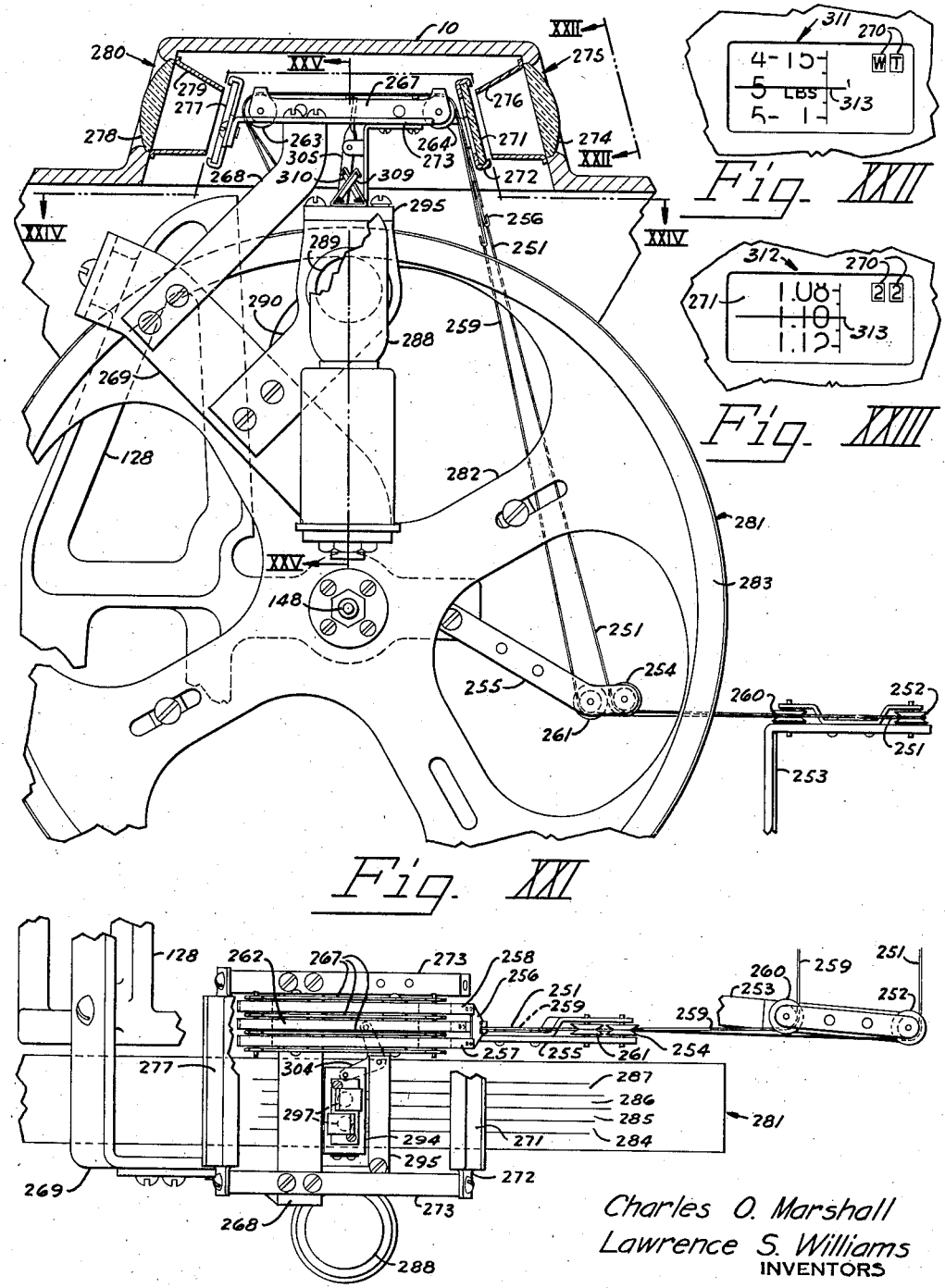

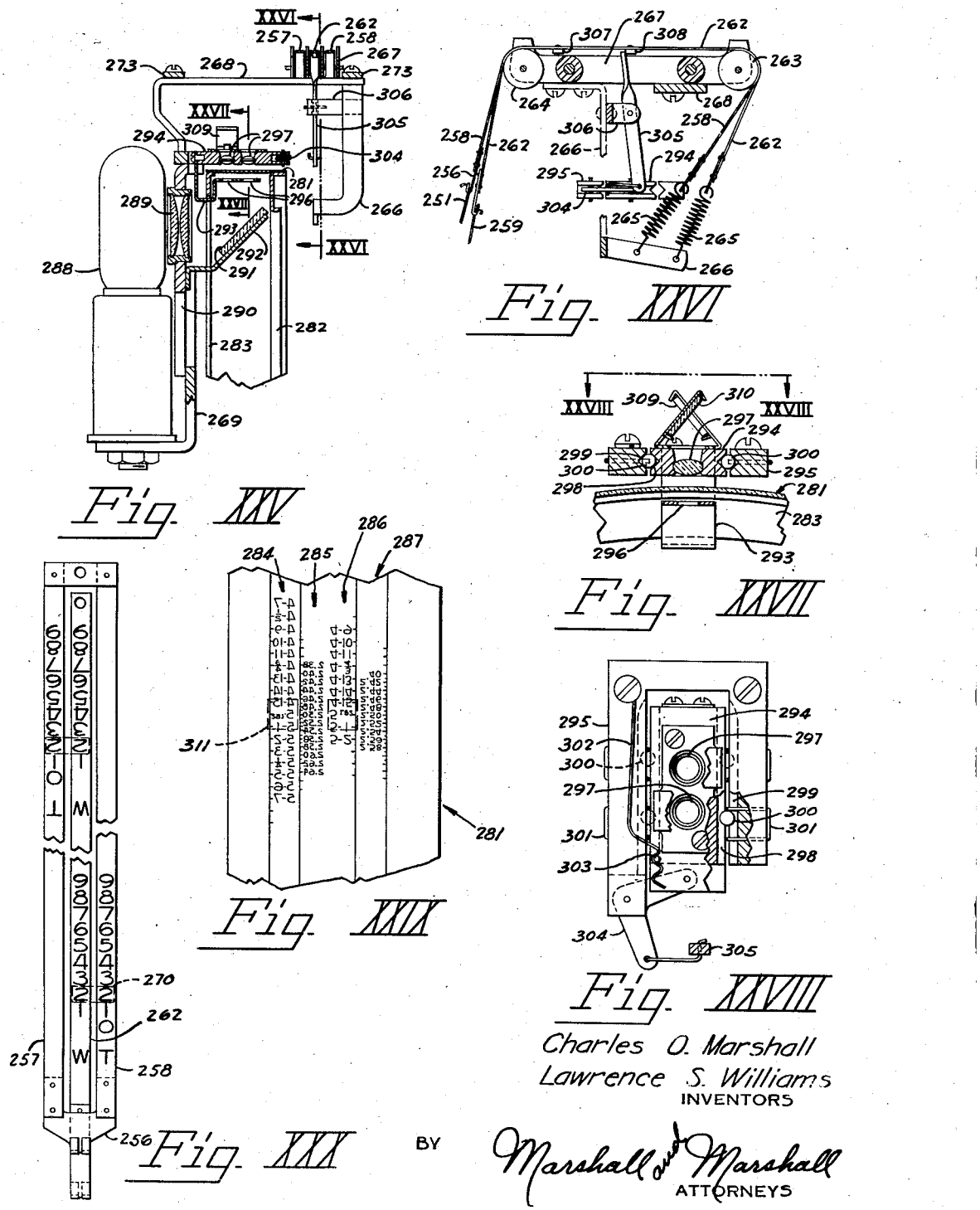

Patented Feb. 8, 1944

2,341,226

UNITED STATES PATENT OFFICE 2,341,226

WEIGHING SCALE

Charles O. Marshall and Lawrence S. Williams, Toledo, Ohio, assignors to Toledo Scale Company, Toledo, Ohio, a corporation of New Jersey Application April 24, 1942, Serial No. 440,308

15 Claims. (Cl. 265—29)

This invention relates to weighing scales, and more particularly to computing weighing scales for affording an indication not only of the weight of merchandise but also of the product of such weight times the price per pound at which the merchandise is sold.

In general there are three types of computing scales. The first of these, which is the earliest, consists of a beam scale in which either the beam fulcrum, or its connection with the load receiving members, may be changed to give different leverages according to the price of the merchandise being sold on the scale. This type of scale has several disadvantages, but its primary fault lies in the necessity for manually moving the beam, or its connections, to change the beam leverage and accomplish the multiplication of the weight times the desired price.

To eliminate thes difficulties, and the slow operation which resulted from the general use of beam scales, the automatic computing scale was developed. In this scale money value indication, as well as weight indication, is afforded by the combination of a fixed indicator and movable chart, or vice versa, in which the chart carries rows of computed amount indicia, representing the value of weight times selling price, on the same reading line as the indicia for weight alone. In this type scale the operation is quite rapid but the manufacture of the charts themselves is very difficult. For example, in a 30 pound scale having prices from 5¢ per pound to 80¢ per pound, there may be as many as thirty or forty thousand individual indicia marks on the surface of the chart. These indicia must all be very accurately positioned or else error in reading will result. The manufacture of such a highly complicated chart is extremely expensive since it must be made light enough so that it will not react on the weighing mechanism and destroy the accuracy of the scale.

Various scales have been developed in which follower mechanisms, or position selector mechanisms, have been employed which move auxiliary multiplying means various distances corresponding to the weight of merchandise on the scale and in which the multiplying means may be varied to multiply the weight on the scale by the selected prices. These mechanisms are all extremely expensive to manufacture and slow in operation and have not achieved commercial success for these reasons.

It is an object of this invention to provide a computing weighing scale in which one set of money value indicia serves to indicate the amount of the sale regardless of the price per pound at which the merchandise is sold.

It is another object of this invention to provide a computing weighing scale employing the basic principle of leverage variation to change the multiplying ratio of the scale; but employing such prinicple in such a way as to be rapid and efficient in operation.

It is another object of this invention to provide a factor lever weighing scale in which the factoring, or multiplication of weight times prices, is accomplished by varying the point of application of the load on the load counterbalancing mechanism.

It is another object of this invention to provide a factor lever weighing scale having automatic load counterbalancing mechanism in which the multiplication of weight times any price from 1¢ to 99¢ is possible.

Still another object of this invention is to provide a factoring weighing scale in which the variation of the point of application of load to the load counterbalancing mechanism is accomplished by merely actuating one of a series of preconnected linkages rather than by moving levers or linkages.

Still another object of this invention is to provide a computing scale having weight, price per pound and computed amount indication for both the customer and the merchant.

A further object of this invention is to provide an automatic load counterbalancing factoring scale in which the prices to be multiplied by the weight of merchandise on the scale may be set up by a simple keyboard having only one key for each dimes increment and one key for each pennies increment of prices to be selected.

A still further object of this invention is to provide a factoring weighing scale having a projected indication for both the merchant and the customer of weight and of total money value and a positive indication for both the merchant and the customer of the price per pound by which such weight is multiplied to give the total money value.

More specific objects and advantages are apparent from the description, in which reference is had to the accompanying drawings illustrating a preferred form of scale embodying the invention.

In the drawings:

Fig. I is a view in front elevation of a weighing scale embodying the invention.

Fig. II is a greatly enlarged view from the left side of Fig. I, part of the housing being broken away and showing the load counterbalancing mechanism.

Fig. III is a rear view in elevation of the mechanism shown in Fig. II with the covers removed and certain parts broken away.

Fig. IV is a horizontal sectional view, taken substantially from the position indicated by the line IV—IV of Fig. III.

Fig. V is a fragmentary enlarged detailed view, taken substantially on the line V—V of Fig. IV.

Fig. VI is a detailed enlarged sectional view, taken substantially on the line VI—VI of Fig. IV.

Fig. VII is a vertical sectional view, taken substantially from the position shown by the line VII—VII of Fig. IV.

Fig. VIII is a diagram showing the function and operation of the lever system employed in the mechanism embodying the invention.

Fig. IX is a fragmentary plan view of manually operable price-set-up means employed in a preferred embodiment of the invention.

Fig. X is a front view in elevation of manually operable key mechanism for the price-set-up means illustrated in Fig. IX.

Fig. XI is a fragmentary sectional view, taken substantially from the position indicated by the line XI—XI of Fig. X.

Fig. XII is a fragmentary detailed view, taken substantially on the line XII—XII of Fig. IX.

Fig. XIII is a fragmentary detailed view, taken substantially from the position indicated by the line XIII—XIII of Fig. X.

Fig. XIV is a fragmentary horizontal sectional view, taken on the line XIV—XIV of Fig. XIII.

Fig. XV is a fragmentary detailed view, taken substantially from the position indicated by the line XV—XV of Fig. X.

Fig. XVI is a fragmentary detailed view, taken substantially on the line XVI—XVI of Fig. XV.

Fig. XVII is a fragmentary detailed view illustrating the operation of key-set-up mechanism.

Fig. XVIII is a view of that portion of the key-set mechanism illustrated in Fig. XV but shown in a different position.

Fig. XIX is a view of that portion of the mechanism illustrated in Fig. XIII but shown in a different position.

Fig. XX is a view somewhat similar to Fig. XVIII but showing the operation of a different one of the operating keys.

Fig. XXI is a further enlarged fragmentary view in elevation, taken substantially from the position shown by the line XXI—XXI of Fig. III and illustrating price and value indicating mechanism.

Fig. XXII is a fragmentary view in elevation, taken substantially from the position indicated by the line XXII—XXII of Fig. XXI and showing the indication of weight afforded by the mechanism.

Fig. XXIII is a view similar to Fig. XXII but showing price and value indication.

Fig. XXIV is a fragmentary plan view, taken substantially from the position indicated by the line XXIV—XXIV of Fig. XXI.

Fig. XXV is a fragmentary vertical sectional view, taken substantially on the line XXV—XXV of Fig. XXI.

Fig. XXVI is a detailed view further enlarged and taken substantially on the line XXVI—XXVI of Fig. XXV.

Fig. XXVII is a fragmentary detailed still further enlarged sectional view, taken substantially on the line XXVII—XXVII of Fig. XXV.

Fig. XXVIII is a detailed plan view, taken substantially from the position indicated by the line XXVIII—XXVIII of Fig. XXVII.

Fig. XXIX is a fragmentary view of an indicia-bearing chart employed in the device and illustrating the indicia borne thereby and its arrangement thereon.

Fig. XXX is a greatly enlarged view of price indicia borne by price indicating means employed in the device.

These specific drawings and the specific description that follows merely disclose and illustrate the invention and are not intended to impose limitations upon the claims.

A main box-like housing 10, which is removably mounted upon a base 11, has an opening 12 (Fig. VII) in its top and an upwardly extending collar 13 around the opening 12. The housing 10 serves only to cover the mechanism of the scale and is shown removed in Figs. III and IV. A load receiving platter 14, to which is attached a downwardly extending skirt 15, is removably mounted on the upper end of a load receiving spider 16 (see also Fig. III) which extends upwardly through the opening 12 in the housing 10. The skirt 15 surrounds the upper end of the collar 13 to prevent the ingress of dust into the interior of the housing 10.

The load receiving spider 16 has two arms 17 and 18 which extend longitudinally of the scale (see also Fig. VIII) and the lower ends of which are bolted to the upper ends of two spider legs 19. The spider legs 19 are rigidly connected by means of a longitudinally extending bar 20 (Figs. III, IV, VII and VIII). A bearing 21, having a downwardly extending groove, is socketed in the lower end of each of the legs 19. The bearings 21 ride on pivots 22, one located in each of two arms 23 and 24 of a two-armed transversely extending floating lever 25.

A pair of supporting feet 26 extend downwardly from the bar 20 parallel to the lower ends of the legs 19 and have bearings 27 socketed in their lowermost ends. The pivot line of the bearings 27 is coextensive with the pivot line of the bearings 21. The bearings 27 ride on load pivots 28, one of which is located in the end of each of the arms of a transversely rockable two-armed lever 29. The lever 29 is fulcrumed, by means of pivots 30, in fulcrum bearings 31 which are mounted in the upper ends of a pair of fulcrum stands 32 bolted to, and extending upwardly from, the base 11. The end of the lever 29, opposite its load pivots 28, consists of a heavy counterweight 33 which counterbalances the weight of the floating lever 25, spider feet 19, spider 16 and load receiving platter 14.

The load spider 16 is "checked" to insure its vertical movement by means of check links 34 and 35. The stationary end of the check link 34 (Fig. VII) is pivotally connected to an adjustable bracket 36 which is adjustably bolted to the upper end of a stand 37, the lower end of which is bolted to the base 11. The other end of the check link 34 is pivotally connected to a stud 38 which is attached to a second stud 39 secured to the upper end of the leg 19 adjacent the connection between the arm 17 of the spider 16 and the leg 19.

The check link 35 is located at the opposite end of the device and its stationary end is pivotally and adjustably secured to an ear 40 (Fig. IX) which is an integral part of a main stand 41 comprising two vertical legs 42 and a horizontal cross arm 43 (see also Fig. III). The two-legged stand 41 is bolted to the base 11. The free end of the check link 35 is pivotally attached to a stud 44 which is fastened to the upper end of the leg 19 associated with the arm 18 of the spider 16.

Adjacent each of the supporting feet 26 of the bar 20 there is a downwardly extending finger 45 (Fig. III) each of which has a horizontally turned end through which an upwardly directed cone-pointed screw 46 is adjustably threaded. Similar cone-pointed screws 47 are adjustably mounted with their points down, being threaded through ears 48 attached to the ends of the arms of the lever 29 (see also Fig. IV). The points of the pairs of screws 46 and 47 are oppositely directed and have substantially the same center lines. Expansible members 49, each of which comprises two spring retaining cups 50 having cone seats in their outer surfaces and a spring 51 which tends to force the cups apart, are located between the opposing points of each of the pairs of cone-pointed screws 46 and 47; the cone points of the screws being seated in the cone-shaped sockets in the cups 50. These expansible members 49 exert pressure against the fingers 45 and ears 48 of the bar 20 and lever 29 and serve as pivot retainers to hold the load pivots 28 of the lever 29 firmly seated in the bearings 27 which are located in the lower ends of the supporting feet 26.

Similarly arranged pivot retainers are located to retain the fulcrum pivots 30 of the lever 29 in their bearings 31 and act on oppositely directed cone-pointed screws, one of each pair being threaded into each of two ears 52 (Fig. IV) of the lever 29 and the other screw of each pair being threaded in one end of a bracket 53 which is bolted to a pair of bosses 54 extending upwardly from the base 11.

A similar pair of pivot retainers securely hold the bearings 21 (Fig. VII) which are socketed in the lower end of the spider legs 19 on the pivots 22 of the floating lever 25, being directed between ears 55 (Figs. IV and VI) of the lever 25, through which adjustable cone-pointed screws 56 are threaded, and fingers 57 of the bar 20 through which upwardly directed cone-pointed screws 58 are threaded. An expansible member 58a, similar to the member 49, is located between the points of the screws 56 and 58.

The transverse floating lever 25 serves as a ratio lever in the device to establish a ratio of 10:1 to enable the calculation of prices in pennies and in dimes and in combinations of the two. The two arms 23 and 24 of the floating ratio lever 25 extend parallelly transversely across the device and in each of the arms, at its outermost end, is a downwardly directed pivot 59 (Fig. IV) the edge of which is parallel to edges of the pivots 22. A similar downwardly directed pivot 60 is located in each of the arms 23 and 24 on the opposite side of the load pivots 22 of the lever 25. The pivot distance between the pivots 22 and 60 is one-tenth of the distance between the pivots 22 and 59. The weight of the arms 23 and 24 is counterbalanced by means of a loaded pipe-like frame 61 of the floating lever 25 which is located along one side of the mechanism and so weighted that the floating lever 25 is balanced about the pivot line of the pivots 22.

The pivots 59, in the ends of the arms 23 and 24 of the floating ratio lever 25, are engaged in bearings 62 (Figs. VII and VIII) which are mounted in the lower ends of the arms of an inverted U shaped loading frame 63 (see also Figs. IV and XII). The loading frame 63 consists of a U shaped channel member 64 which extends longitudinally of the scale and has two downwardly directed legs in the ends of which the bearings 62 are rockably secured. A similar loading frame 65 is similarly located with respect to the pivots 60 and comprises a longitudinally extending channel member 66 having two downwardly directed arms 67 (see also Fig. III) in the ends of each of which there is located a bearing 68 in which the pivots 60 are engaged. The two loading frames 63 and 65 are substantially identical in construction, the only difference being that they face in opposite directions since they are located at opposite sides of the floating lever 25. The pivots 60 (Figs. III and VI) are retained in the bearings 68 by pivot retaining means similar in construction and operation to those already described for retaining various other pivots in their bearings. Each of the retaining means for the pivots 60 comprises a downwardly directed cone-pointed screw 69 which is threaded through the cross arm of the U shaped member 66, an upwardly directed cone-pointed screw 70 which is threaded through an ear 71 of the arm 23 or 24 and an expansible member 72 identical in construction with the expansible members 49 previously described.

The pivots 59 are similarly retained in the bearings 62 by means of similar retaining members directly opposingly between the U shaped channel member 64 and ears 73 constructed integrally with the ends of the arms 23 and 24 adjacent the location of the pivots 59.

The U shaped channel member 66 carries a series of vertically extending and vertically movable spear points 74 (Figs. III, VIII and XII). These spear points are vertically slidable in slots cut in the bottom cross arm of the U shaped channel member 66 and guided by means of slots in an angular comb-like guide 75 which is secured to the inner side of the U shaped channel member 66 and extends horizontally over the open upper end thereof. Each of the spear points 74 has a shoulder 76 extending from its outer edge which is engageable beneath a rolled lip 77 of a latch 78 which is hinged in one arm of the U shaped channel member 66 and extends vertically therefrom being resiliently held in position to latch above the shoulders 76 of the spear points 74 by means of a pair of springs 79 extending between the latch 78 and the U shaped channel member 66. Each of the spear points 74 is urged upwardly by means of a hair pin spring 80 (Fig. XII) one end of which is hooked in a hole 81 in the upper end of the spear point 74 and the other end of which is secured in an eye 82 on the inner side of the inner arm of the U shaped channel member 66. The shoulder 76 is cut at right angles to the side of the spear points 74 at its upper edge to furnish a firm engagement between the rolled lip 77 of the latch 78 and the shoulder and the bottom edge of the shoulder 76 is angular with respect to the edge of the spear point 74. Thus whenever any one of the spear points 74 is moved downwardly the angular lower edge of the shoulder 76 cams the latch 78 outwardly and away from the edges of the spear points 74, beyond the line of the squared upper surface of the shoulders 76, releasing any of the spear points 74 which might have been latched beneath the lip of the latch 78. These spear points 74 so released are urged upwardly by the springs 80 until engagement between pods 83, which are punched protuberances on the sides of the spear points 74, and the cross arm of the U shaped channel member 66 prevents further motion. There are ten of the spear points 74 so mounted in the loading frame 65, one of such spear points representing each dimes value of possible selling prices of merchandise from zero to ninety inclusive.

A similar set of ten spear points 84 are mounted in the U shaped channel member 64 being guided for vertical movement by an angular comb 85 and having shoulders 86 which are engageable beneath a rolled lip 87 of a resiliently mounted latch 88 hinged to one arm of the channel member 64 and held against the edge of the spear points 84 by springs 89 (see also Fig. IV). The spear points 84 are urged upwardly by hair pin springs 90 which are hooked in openings 91 in the upper end of the spear points 84 and ears 92 in the arm of the U shaped channel member 64. The springs 90 hold the spear points 84 upwardly and a pod 93, on each of the spear points 84, limits their upward travel. There are ten of the spear points 84, one corresponding to each of the possible cents values of prices of merchandise to be weighed on the scale from zero to nine inclusive.

The spear points 74 and 84 are spaced equidistantly along the longitudinal length of the loading frames 63 and 65. The two loading frames 63 and 65 are maintained in an upright parallel position by means of links 94 (Figs. VII and VIII) one of which is connected between the ends of the loading frame 63 and 65 at each end of these frames. The links 94 are loosely mounted on pins 95 which extend from the ends of the loading frames 63 and 65 and are held on these pins by retaining clips 96 which are secured to the ends of the frames 63 and 65. The links 94 are also pivotally connected to the two spider legs 19 by means of pins 97, one of which extends outwardly from each of the legs 19 and is loosely engaged in a hole in one of the links 94. The links are retained on the pins 97 by means of clips 98 which are secured to the legs 19.

The weight of all of the mechanism which has been so far described, i. e., the load receiving platter 14, the spider 16, legs 19, floating lever 25, loading frames 63 and 65 and their various connections and linkages, is all supported on the load pivots 28 of the two-armed lever 29 and counterbalanced by means of the counterweight 33 of that lever. Thus this entire mechanism floats and its weight has no effect upon the operation of the remaining mechanism of the scale which will now be described.

A main lever 99 (Figs. II, III, VII, VIII and IX) extends longitudinally of the machine and comprises two parallel arms 100 and 101 which are connected by two cross arms 102 (Figs. VIII and IX). The main lever 99 is fulcrumed by means of two fulcrum pivots 103 (Fig. III), one of which extends outwardly from the end of each of the arms 100 and 101. The pivots 103 rest in fulcrum bearings 104 one of which is socketed in the upper side of each end of the cross arm 43 of the main stand 41. The pivots 103 are retained in their bearings 104 by means of a pair of pivot retainers which comprise two downwardly directed cone-pointed screws 105 (Fig. IX) which are threaded through a pair of fingers 106 of the cross arm 43 and a pair of similar screws, one extending upwardly through each of a pair of ears 107 on the main lever 99 adjacent and opposite to the fulcrum pivots 103. An expansible member (not shown), identical with the members 49 and 72 already described and illustrated, is located between each of the pairs of cone-pointed screws 105 threaded through the pairs of fingers 106 and ears 107. In all of the pivot retainers, that one of the cone-pointed screws which extends in the direction opposite to the knife edge of the pivot being retained thereby, terminates on the pivot line of that pivot.

The arm 100 extends along above the loading frame 65 and the arm 101 is located substantially parallel to, and above, the loading frame 63. Nine load pivots 108 extend rearwardly from the arm 100 of the main lever 99, their edges being parallel to the fulcrum pivots 103 of the main lever 99 but upwardly directed. Each of the pivots 108 is rockable on an axis lying along its knife edge by means of a pair of adjusting screws 109 (Figs. IX and XII) which are threaded downwardly through the arm 100 and engage a flattened upper surface on the shank of the pivot 108 with which the pair of screws is associated. One of the screws 109 of each pair is located on each side of a vertical plane lying along the knife edge of the pivot 108. The pivots 108 are equidistantly spaced longitudinally along the arm 100 of the lever 99 and each of them is located above and is associated with one of the spear points 74 of the loading frame 65.

Load pivots 110 are similarly mounted in the arm 101 of the main lever 99 and extend transversely therefrom toward the front of the mechanism. The edges of the pivots 110 are all parallel and the edge of each one of the pivots 110 is on the same pivot line as the edge of the corresponding pivot 108 which extends in the opposite direction from the arm 100 of the lever 99. Each of the pivots 110 is rockable on an axis coextensive with its knife edge by means of two adjusting screws 111 which are similar to the screws 109 and operate in the same manner. The load pivots 110 are equidistantly spaced along the arm 101 of the main lever and are located above the spear points 84 with which they are associated.

Over each of the load pivots 108 or 110 there is hung an inverted U shaped link 112 (Fig. III) which has a cross arm shaped like a shallow V. The interior surface of the apex of the V is hardened and rests on the knife edge of that one of the pivots 108 or 110 on which the link 112 hangs. A linking pivot 113 extends transversely through the two arms of the link 112 and has an upwardly directed knife edge which also extends outside of the two arms of the link 112. On each of the linking pivots 113 there is hung an elongated U shaped loading loop 114. Through each of the arms of the loop 114, near its upper end, there is cut an aperture 115 (see also Fig. XII) through which the ends of the linking pivot 113 extend. The aperture 115 has a V shaped upper edge in which the knife edge of the pivot 113 fits. The body or cross arm portion of the U shaped loop 114 is pressed into a conical depression in which the point of that one of the spear points 74 or 84, which is associated therewith, is adapted to be seated. Each of the loops 114, being hung on its own load pivot 108 and having a separate one of the spear points seatable therein, serves to apply that portion of the total load on the scale to the main lever 99 which has been applied to the associated one of the loading frames 63 or 65 by the floating ratio lever 25.

The nine load pivots 108 correspond to the nine dimes values, i. e., 10¢ to 90¢ inclusive, of the price of merchandise to be weighed on the scale. Similarly, the nine loads pivots 110 correspond to the cents values, 1¢ to 9¢ inclusive, of price of merchandise to be weighed on the scale.

The tenth one of the two series of spear points 74 and 84 (i. e., that one of such spear points in the series of spear points which is located beneath the fulcrum pivots 103 of the main lever 99) is not associated with either a load pivot or a loading loop. These first two spear points 74' and 84' (Figs. III and IX) represent "0," dimes and cents respectively. Located immediately below the spear point 74' is a stud 116 on which the spear point 74' is seated when it is moved downwardly and caught beneath the latch 78. A similar stud 117 is similarly located beneath the spear point 84'.

At the end of each of the arms 100 and 101 of the main lever 99, opposite the fulcrum pivots 103, there is located a power pivot 118 (Figs. VII, VIII and IX). The power pivots 118 extend laterally from the ends of the arms 100 and 101 with their knife edges parallel to the edges of the fulcrum pivots 103 and load pivots 108 and 110. The power pivots 118 are seated in bearings 119 which are socketed in the upper surface of the ends of an inverted substantially L shaped power bracket 120. The pivots 118 are retained in the bearings 119 by means of two pivot retainers, similar to the pivot retainers already described, and each of them comprising upwardly extending cone-pointed screws 121 which are threaded through ears 122 on the ends of the arms 100 and 101 and downwardly extending cone-pointed screws 123 which are threaded through fingers 124 extending upwardly from the power bracket 120. Between the points of each of the pairs of cone-pointed screws 121 and 123 there is located an expansible member 125 similar to the expansible members 49 and 72 already described.

To the end of the arm 100, which extends beyond the position of the power pivot 118, there is pivotally secured a rod 126 (Figs. II, III and IV) which is the plunger of a motion damping dashpot 127 into which the rod extends. The dashpot 127 is fastened to a sector guide bracket 128 bolted to the base 11.

The lower end of the L shaped bracket 120 (Figs. VII and IX) is formed into a foot 129 (see also Figs. II and III) which extends horizontally substantially parallel to the arms of the main lever 99. A check link 130 (Fig. III) stretches longitudinally along the base of the machine parallel to the main lever 99 between a pivot plate 131, which is secured to one of the legs 42 of the frame 41, and a pivot plate 132 bolted to the heel of the foot 129 of the power bracket 120. The check link 130, the lever 99, the stand 41 and the power bracket 120, form a checking parallelogram for insuring the true vertical movement of the power bracket 120.

A cone pivot 133 (Figs. II and III) extends downwardly from the toe of the foot 129 and rests in a stirrup 134 which is adjustably linked to the lower end of a flexible metallic ribbon 135 which extends upwardly overlying the arcuate face of a power sector 136. The ribbon 135 is clamped to the upper edge of the sector 136 which is a portion of a load counterbalancing pendulum 137 also comprising two arcuate fulcrum sectors 138, to the lower ends of which a pair of flexible metallic ribbons 139 are clamped. The ribbons 139 extend upwardly along the faces of the fulcrum sectors 138 and then along two machined guides 140 to the upper ends of which the ribbons are clamped. The guides 140 are formed at the upper end and on one side of the sector guide bracket 128. The pendulum 137, in addition, comprises an offset body 141, of which the sectors 136 and 138 are formed extensions, and into the lower end of which there is threaded a stud 142 on which a pendulum weight 143 is adjustably mounted. A floating rack frame 144 is mounted straddling the pendulum body 141 and, by means of a somewhat flexible plate 145, supports a vertically extending rack 146. The rack 146 is in mesh with a pinion 147 which is pinned on a horizontal shaft 148 parallel to the longitudinal length of the main lever and journaled in a pair of arms 149 of the sector guide bracket 128.

When a load is placed upon the scale the weight of the load is multiplied through the various levers described and finally the power bracket 120 is moved downwardly a certain distance in response thereto. This pulls downwardly on the metallic ribbon 135 which swings the pendulum 137 in a counterclockwise direction (Fig. II) and causes it to climb up on the sector guides 140 by the winding action of the ribbons 139 on the fulcrum sectors 138. This raises the pendulum body 141, and the rack 146 connected thereto, and rotates the pinion 147 and shaft 148 in a counterclockwise direction (Fig. II). To the shaft 148 may be secured any form of indicator or chart which is desired.

Theory of operation

The theory of operation of the portions of the mechanism so far described, which form the weighing and factoring section of the weighing scale, can best be understood by comparing the main lever 99 to the beam of a conventional beam type weighing scale. The load placed upon the load receiving platter 14 is supported on the floating transverse ratio lever 25 which distributes it in a ratio of 10:1 between the loading frames 63 and 65. Transversely the ratio lever 25 (as can be seen in Figs. VIII and XII) is eleven units of measurement long between the pivots 59 and 60 and the pivots 22, on which the load is placed, are located one-eleventh of this distance from the pivots 60 and ten-elevenths of this distance from the pivots 62. Therefore, the total load is distributed between the loading frames 65 and 63 in a ratio of 10:1 (in accordance with the ratio between the dimes and pennies values of prices of merchandise to be weighed on the scale). The load pivots 108, which are associated with the dimes loading frame 65, are placed along the arm 100 of the main lever 99 equal successive distances. In Fig. VIII, if we consider the first of such pivots 108 as the 10¢ pivot, the second as the 20¢, etc., that one which is shown connected by means of a loop 114 to one of the spear points 74 of the loading frame 65 represents 40¢. If we look for a moment now at the load pivots 110, it will be seen that in Fig. VIII the second one of these load pivots is shown connected to a spear point 84 on the loading frame 63 by means of a loop 114. The ratio lever 25 has distributed the weight on the platform (as explained above) between the loading frames 65 and 63 in a ratio of 10:1. Therefore if the main lever 99 is considered a beam, the effect of connecting the mechanism as shown in Fig. VIII is equivalent to hanging one "poise weight" of ten increments on the fourth point of the arm 100 of such beam and one "poise weight" of one increment on the second point of the arm 101. The forces produced by these increments so loaded on the main lever 99 are, of course, proportional to the units or fractional units of weight $w$, comprising the original weight placed upon the load receiving platter 14, so that the moment actually exerted on the arm 100 is proportional to "$40w$" and the corresponding moment exerted on the arm 101 of the main lever 99 is proportional to "$2w$." As on a beam scale, the total value of the "poise weights" placed upon the beam is the sum of the individual weights so placed and therefore, with the mechanism connected as shown in Fig. VIII, a total moment proportional to "$42w$" is acting on the main lever 99. This moment is counterbalanced by moving the pendulum 137 and swinging the weight 143 far enough to offset it. This results in rotation of the shaft 148 and of the indicating means a sufficient distance to indicate a money value equal to a price of 42¢ per pound times the number of pounds represented by $w$.

By changing the hookup between the load pivots 108 and dimes loading frame 65, $w$ can be multiplied by any value from ten to ninety and the pendulum 143 will be lifted progressively further to counterbalance the successively higher results of multiplying $w$ by larger prices. Similarly, by successively hooking up the load pivots 110 with the loading frame 63, the multiplication of $w$ by the pennies values of the prices will be increased and will increase the total load to be counterbalanced by the pendulum 137. Any possible combination from 1¢ to 99¢ of the pennies and dimes values of prices may thus be summed to arrive at the proper force to act on the pendulum. This relationship may be expressed by the equation $$kFp = Pw + \frac{pw}{10}$$

in which $Fp$ is the force counterbalanced by the pendulum and $P$ is the dimes value of the price of the merchandise being weighed on the scale and $p$ is the cents value of the price of the merchandise being weighed on the scale; $w$ is the weight of the merchandise on the load receiving platter 14; and $k$ is a constant determined by the ratio of the lever 99.

In the event that the price for the merchandise on the scale is less than 10¢, or an even dimes value, one of the loading frames should not have force applied thereto. If for example, the price of the merchandise is between 1 and 9¢, $P$ will equal "0," and no force should be multiplied or applied to the dimes load pivots of the main lever 99. For this reason the spear point 74', which corresponds to "0" dimes value, is not connectible with the main lever 99 but instead rests on the stud 116 which is secured to the frame. Similarly, in the event that the price is an even dimes amount, the spear point 84', which corresponds to "0" cents or pennies, is engaged with the stud 117 to prevent the addition of any increment for $p$ to the arm 101 of the main lever 99.

*Price-set-up mechanism*

Means must be provided with which to depress the various spear points 74, 74', 84 and 84' so that the operator can set up the mechanism for pricing merchandise at any selected price. In the preferred embodiment of the invention herein disclosed this price-set-up mechanism comprises a bank of keys 150 for setting up cents values and a similar bank of keys 151 for setting up dimes values. Cents value keys 150 are located in a longitudinally extending row and the dimes keys 151 are in a similar row located immediately in back of the cents keys. These two sets of keys form a keyboard which is located at the front of the scale (Fig. I) in a position convenient for operation. The keys are located above a horizontal plate 152 (Figs. IX, X, XII) which is located beneath an opening in the housing 10. The plate 152 is supported on the upper ends of three posts 153 and a bracket 154 which extend upwardly from the key-set mechanism framework supported in turn by two frame members 155 which are bolted to the base 11.

Each of the keys 150 and 151 comprises a button 156 which is set on the upper end of a flattened stem 157 vertically movable in a slot 158 in the plate 152 and a slot 159 in a second plate 160 located beneath and parallel to the plate 152. A second stem 161, which is somewhat similar in shape, lies adjacent each of the stems 157 and overlaps the stem 157 lengthwise. The two stems 157 and 161 are movable relative to each other in a vertical direction. In the side elevation, the stem 157, which may be referred to as the upper stem, can be seen to have a squared shoulder 162 (Figs. XII and XVII) which, when the key is in its uppermost position, is engaged with the undersurface of the plate 152. The stem 157 is urged toward this upper position by a wire spring 163 which is hooked in a small hole 164 in the shoulder 162 and looped toward the back of the key-set mechanism and then brought forward and hooked in a turned-over forward lip 165 (Fig. XII) of the plate 152. When the stem 157 is moved downwardly the two arms of the spring are pulled away from each other and the tension thus created urges the stem 157 and button 156 upwardly. The lower edge of the shoulder 162 is beveled to form a cam 166 (Fig. XVII).

The lower stem 161 of each of the keys is substantially rectangular in shape but has a squared shoulder 167 near its lower end, the bottom of which is angular forming a cam 168. The lower stem 161 is urged upwardly by a spring 169 hooked in an eye 170 formed in the side of the lower stem 161 and then looped and brought forward and hooked in the lip 165 of the plate 152 (Fig. XII). The lower stem 161 is moved downwardly by the engagement of a pod 171, stamped in the side of the upper stem 157, with the upper edge of the lower stem 161. A latch 172 (Figs. X, XII and XVII), which is similar to the latches 78 and 88 but in an inverted position, has a rolled lip 173 at its lower edge and extends along immediately behind the row of cents keys 150. The latch 172 is hinged at its upper end in the plate 160 and its lip 173 is resiliently urged forward toward the shoulders of the lower stems 161. When any one of the lower stems 161 is moved downwardly, the latch 172 is cammed backwardly by the cam surface 168 and when the lower stem 161 has been completely depressed the shoulder 167 catches beneath the lip 173 of the latch 172.

The lower stems 161 of the keys 151 engage a substantially identical latch 174 which has a rolled-over lip 175 and is mounted similarly to the latch 172 but along the row of keys 151. Each of the upper stems 157 of the keys 151 is urged upwardly by a spring 176 which is hooked in an ear 177 on such upper stem, looped forward and engaged in a lip 178 along the back edge of the plate 152. The lower stems 161 of the keys 151 are urged upwardly by similar springs 179 similarly attached to the stems and the lip of the plate.

To each of the upper stems of the keys 150 there is riveted a set bar 180 (Figs. IX, XII and XVII) which extends at right angles to the stem 157 inwardly between the pair of dimes keys 151, located behind each of the cents keys 150, and which has a turned end 181 which terminates immediately above the upper end of that one of the spear points 84 associated with the load pivot 110 corresponding to the value of $p$ represented by the particular one of the pennies keys to the stem of which the set bar 180 is attached. Thus, by depressing a selected one of the keys 150, that spear point 84 associated therewith is moved downwardly until its squared shoulder 86 (Fig. XII) is engaged beneath the lip 87 of the latch 88 and until its point is engaged in the seat of the bottom of its loading loop 114.

Somewhat similar set bars 182 are riveted to the upper stems 157 of the dimes keys 151 and extend transversely across the machine having a turned end 183 which is positioned above the upper end of that one of the spear points 74 associated with that one of the load pivots 108 corresponding to the value of P represented by the particular key 151 in question. Thus, by pressing downwardly on a selected one of the dimes keys, that one of the spear points 74 associated with the key is depressed until its shoulder 76 catches beneath the rolled lip 77 of the latch and its point is engaged in the bottom of that one of the loading loops 114 attached to the proper load pivot 108 for the dimes value sought (in Fig. XII a dimes spear point is shown so engaged and a pennies spear point is shown in its disengaged position).

A shaft 184 extends along the bank of keys 150 beneath the cams 166 of the upper stems 157 and just above the surface of the plate 160. The shaft 184 is rotatably journaled in the upper ends of two links 185 (Figs. XI, XIII and XVI) which are pivoted in end frame members 186, one of which is located at each end of the plate 160 and the rear ends of which are bolted to the upper ends of the frame members 155. A similar shaft 187 is similarly mounted with respect to the keys 151 and the cams 166 of the upper stems 157 of these keys, being rotatably journaled in a pair of links 188 which are also pivotally mounted in the frame members 186. The links 188 extend down below the frame members 186 and their lower ends are rigidly connected by means of a tube 189 which extends beneath the key-set mechanism parallel to the shafts 184 and 187.

Whenever one of the keys 150 is depressed the cam 166 of its upper stem cams the shaft 184 forwardly (to the left in Figs. XII and XVII). Similarly, depression of one of the keys 151 cams the rod 187 toward the front (the left in Fig. XVII). At the left end of the key-set mechanism (shown fragmentarily in plan view in Fig. XIV) there is located a bar 190 through which extend a pair of screws 191 which also extend through the upper ends of the links 185 and 188 and serve as the axes for the two shafts 184 and 187. The bar 190 reciprocates transversely to the axes of the shafts 184 and 187 and is so reciprocated whenever either one of these shafts is cammed forward by the angular cam surface 166 of the upper stems 157 of the keys 150 and 151. The bar 190 is linked to a rod 192 which extends backward into the housing and is hooked in a short arm 193 (Figs. IV and VII) of a bell crank 194. The arm 193 of this bell crank extends horizontally and a long arm 195 of the bell crank also extends horizontally. The arm 195 is located just above the base 11 and is connected to the arm 193 by means of a long vertically extending body 196 which is journaled upon a vertical rod 197 extending between two ears 198 of the sector guide bracket 128. On the end of the long arm 195 of the bell crank 194 there is located a cam 199 (see also Figs. III and V), the upper surface of which is angular. The cam 199 travels on a roller 200 which rolls along a flat topped boss 201 of the base 11. The angular face of the cam 199 is engageable with a roller 202 which is rotatably mounted in a bracket 203 bolted to the arm 23 of the floating transverse ratio lever 25 between the pivot 60 and the counterbalancing frame 61.

Thus when any one of the keys 150 and 151 is depressed, the first action which results is the downward movement of the upper stem 157. There is lost motion between the downward movement of the upper stem 157 and the lower stem 161 of these keys as shown in Fig. XVII. The resultant camming of the shaft 184 or 187, which pulls on the bar 190 and rod 192, swings the bell crank 194 and forces the cam 199 beneath the roller 202. This lifts the transverse floating lever 25 and removes the weight of the merchandise on the platform from the loading frames. This is necessary because if one of the spear points 74 or 84 is engaged beneath the latches 78 or 88, it must be released by the camming action of the spear point shoulders 76 or 86 before the key being subsequently set up can be latched behind the lips 77 or 87. If there were no means by which to elevate or hold up the floating transverse lever 25 during this time, after disengagement of previously set up spear points and before engagement of subsequently engaged spear points, there would be nothing supporting the loading frame 63 or 65 as the case might be. If, for example, one of the spear points 84 were engaged beneath the lip of the latch 88, and all of the spear points 74 were disengaged from the latch 78, that amount of the weight on the platter distributed by the ratio lever 25 to the loading frame 65 would not be supported; therefore, the weight applied to the pivots 22 would cause the transverse floating lever to fulcrum on the pivots 59 and the opposite end of the ratio lever would drop, carrying the loading frame 65 with it. The loading frame would thus fall too far for the next spear point to reach a position for latching beneath the lip of the latch 78 and the subsequent key set up would not take place. This is prevented, as outlined, by lifting the transverse floating lever, by means of the cam 199, prior to the depression of the lower key stem 161 and the engagement of the set bar 180 or 182 with one of the spear points 84 or 74.

*Weighing set-up mechanism*

The mechanism which has been described constitutes the means whereby the loads placed on the load receiver are applied to, and counterbalanced by, the automatic load counterbalancing pendulum and also the manually set-up means for varying the ratios of the scale in accordance with the price of the merchandise being weighed thereon. It is also necessary that some means be provided for setting the scale to indicate weight only and not the product of weight and price. This is accomplished by means of a weight key 204 (Figs. IX, XV and XVIII). The weight key 204 comprises an upper stem 205, which is substantially identical to the upper stems 157 of the price keys, and a lower stem 206, which is identical to the lower stems 161 of the price keys. The weight key 204 is located at the right side of the bank of keys corresponding to dimes values of prices. A set bar 207 is riveted to the upper stem 205 and extends at right angles therefrom in toward the mechanism of the scale, its end being positioned over the spear point 84' (Fig. IX) adjacent the end of the set bar 189 of the "0" cents key 150. A second set bar 208 is secured to the set bar 207 and extends through the scale to the opposite side of the dimes load pivots 103 where it is bent parallel with the main lever 99 and then bent in over that one of the spear points 74 which corresponds to the "50¢" or five dimes value key of the dimes keys 151. The lower end of the upper stem 205, of the weight key 204, has an angular cam surface 209 which is in line with the cam surface 166 of the dimes keys 151 and which, when the set key is depressed, cams the shaft 187 forwardly to operate the floating lever raising mechanism and permit the setup to be changed. The lower end of the lower stem 206 of the set key has a squared shouldered 210 and a cam surface 211. The squared shoulder 210 is adapted to be engaged by the undersurface of the lower plate 160 or to latch beneath the lip 175 of the latch 174 which is cammed out by means of the angular surfaces 211 of the lower stem 206.

An angularly-shaped auxiliary stem 212 is riveted to the lower stem 206 and extends downwardly in line with the edges of the cam surfaces 168 of the lower stems 161 of the pennies keys 150. Near the lower end of the auxiliary stem 212 there is a cam surface 213 which is engageable with the lip 173 of the latch 172. Thus when the weight key is depressed, the upper stem 205 first moves down and cams the shaft 187, which operates the floating lever lifting mechanism, and then the lower stem 206 is moved downwardly which, by means of the cam surfaces 211 and 213, cams the latches 174 and 172 and releases any or all of the lower stems 161 of either bank of the price keys which may have been latched beneath the latches 174 and 172. At the same time the set bars 207 and 208 are depressed and in turn set up the spear points 84' for "0" pennies and that one of the spear points 74 corresponding to a value of "50¢." Actually, therefore, when the scale is set for weighing it is pricing the merchandise on the load receiver at a value of 50¢ per pound. The chart or indicating means of the scale has two series of indicia marks, i. e., one series being graduated in money amounts and a second series in weight values and the two series are associated at 50¢ per pound (thus the indicia mark for one pound is adjacent that for 50¢, the indicia mark for four pounds adjacent that for $2.00, etc.). 50¢ has been chosen as the associated weight price because it is midway in the range of prices per pound and because in scales of this type for use in markets and butcher shops merchandise worth more than 50¢ per pound is usually sold in relatively small quantities and the maximum price thus available on the scale has been found to be satisfactory. Of course, if it is desired, the associated weight price may be changed to any other value by simply bending the set bar 208 to set up a different one of the dimes spear points and by printing the chart with a different association between the money value indicia and the weight indicia.

*Weight price interlock*

Because of the nature of the weight set-up mechanism just described, the first price selection after weighing must be controlled. When the weight key has been depressed, and merchandise has been weighed on the scale, it has in actuality been priced at 50¢ per pound and its weight indicated only because of the association between the weight indicia and the money value indicia. If it is then desired to price the merchandise which has just been weighed at a price per pound of less than 10¢, for example, means must be provided to release the 50¢ spear point which was set up by the weight set-up mechanism. If this were not done and the price per pound of the merchandise were, let us say, 7¢, the scale would actually price the merchandise at 57¢. To prevent this class of error from occurring, an interlocking mechanism has been built into the key set-up mechanism so that after a weighing operation a key in each of the banks of keys 150 and 151 must be depressed or the scale will not operate at all but will automatically lock itself.

This can be better understood if it is realized first that the only time that there are not at least two keys (one in each of the two banks of keys) depressed is after the weighing cycle when all of the keys in the two banks have been released by the weight key. However, although none of the keys are depressed, the spear points representing "0" pennies and 50¢ dimes values are depressed, and the only way that the spear points can be released is by depression of some other pennies and dimes values keys. This class of error, that is weighing at a price of 50¢ plus the selected pennies price, is prevented by requiring the "0" dimes key to be depressed whenever a price is selected which is less than 10¢. By depressing the "0" dimes key the 50¢ spear point is released and the scale will operate properly.

If the price to be set up immediately after weighing were an even dimes amount, no error would result from depressing only a dimes key because the 50¢ spear point would be released and the "0" pennies value spear point could remain down. However, in order to prevent confusion in the minds of the operator, the interlock mechanism is designed so that a key must be depressed in each of the banks after weighing or the scale will not operate, i. e., if an even dimes price is selected the "0" pennies key must also be depressed just as the "0" dimes key must be depressed if the price selected is less than 10¢ (of course a combination price such as 24¢ or 87¢, which is selected by depressing a key in each of the banks, automatically prevents error).

The interlock mechanism operates to control the reciprocating bar 190, which operates the ratio lever lifting mechanism, and to lock the bar 190 and the ratio lever lifting mechanism underneath the ratio lever until a key has been depressed in each of the banks of keys. A slide 214 (Figs. XIII and XIX) has two downwardly extending fingers 215 and 216 which are engaged with the rolled lips 173 and 175 of the latches 172 and 174 respectively. The slide 214 is resiliently urged toward the rear of the key mechanism by means of a spring 217 (Fig. XIII) which extends between the finger 216 and a hook 218 secured to the end frame member 186 above which the bar 190 is located. The slide 214 is guided in its reciprocal movement by means of an ear 219, which extends upwardly into a slot 220 in the lower plate 160, and an arm 221 of the slide 214, which extends upwardly through a similar slot 222 in the plate 160. A pin 223 extends through the upper end of the arm 221.

A pawl 224 is pivotally mounted in a bracket 225 which extends up over the bar 190. The pawl 224 has a bifurcated rear portion and a slot 226 between the bifurcations is cut at an angle extending upwardly toward the rear of the pawl 224 (the right in Figs. XIII and XIX). The pin 223 is engaged in the slot 226. The front end of the pawl 224 is engageable in a notch 227 in the upper edge of the bar 190 near its front end and is shown so engaged in Fig. XIX.

At the opposite end of the key-set-up mechanism, just outside and adjacent the lower and auxiliary stems of the weight key 204, there is located a linking bar 228 (Figs XV, XVIII and XX). The linking bar 228 is pivoted near one of its ends on a pin 229 which is inserted in the end of the turned-over lip 175 of the latch 174. The linking bar 228 extends forwardly above the end of the lip 173 of the latch 172 and has a notch 228a which is adapted to be engaged on a pin 230 (see also Fig. XVI) inserted in the end of the lip 173 of the latch 172 (the notch is shown so engaged in Fig. XVIII). When the weight key is not depressed, and the lower stem 206 and auxiliary stem 212 are in their upper position, toward which they are urged by means of a spring 231 (Fig. XV), the linking bar 228 is held up by means of a turned-over finger 232 (Fig. XVI) on the end of the auxiliary stem 212 which hooks beneath a shouldered section 233 of the linking bar 228 and is so shown in Figs. XV, XVI and XX. The linking bar 228 is resiliently urged downwardly by means of a spring 234 which is hooked in its outermost end and secured to the undersurface of the plate 160.

When the weight key is down, or when there is a key depressed in each of the banks of keys, the two latches 172 and 174 are both held back slightly against their actuating springs (the position illustrated in Fig. XIII) and the spring 217 holds the slide 214 back against the lips 173 and 175 of the latches. The pin 223 is moved backwardly (to the right Fig. XIII) and by camming against the inclined edge of the slot 226 has swung the pawl 224 slightly in a clockwise direction to lift the pawl above, and out of possible engagement with, the notch 227 in the bar 190. When the weight key is up, and the price keys are depressed, the two latches 172 and 174 operate independently. The depression of a dimes key swings only the latch 174 and the depression of a pennies key swings only the latch 172.

When the weight key is depressed both latches are swung by means of the lower stem cam surface 211 and the auxiliary stem cam surface 213 and all of the price keys are released to snap upwardly. Also the finger 232 of the auxiliary stem 212 is moved downwardly which permits the linking bar 228 to swing downwardly and engage the pin 230 in the notch 228a which links the two latches 172 and 174 together. After weighing, let us assume that only a dimes key is moved downwardly. The action of the cam surface 168 on the lip 175 of the latch 174 swings this latch away and releases the shoulder 210 of the lower stem 206 of the weight key which snaps upwardly. If the first key depressed after weighing were a pennies key, its cam surface 168 would swing the latch 172 and, if it were not for the linking bar 228, would not release the weight key lower stem 206 from beneath the latch 174 because the auxiliary stem 212 does not hold the weight key stems down. However, since the notch 228a in the linking bar is engaged with the pin 230 of the latch 172, when the pennies key is depressed and the latch 172 swung the latch 174 is also swung and the lower stem 206 of the weight key released.

When the weight key moves upwardly and leaves only one key depressed, i. e., either the single pennies or single dimes key, that one of the latches 172 or 174 not engaged (in Fig. XIX a dimes key is shown in a depressed position and therefore the latch 172 is free to move), swings against the finger of the slide 214 overcoming the spring 217 and moving the slide forward (to the left in Fig. XIX) which by camming against the angular walls of the slot 226 swings the pawl 224 in a counterclockwise direction downwardly into the path of the notch 227 in the top of the bar 190.

Normally when the upper stem of a price key moves downwardly its cam 166 engages either the shaft 184 or 187 and moves the rod 190 toward the front to swing the floating lever lifting cam 199 in beneath the floating lever and then when the upper stem moves upwardly, leaving the lower stem engaged with the latch 172 or 174, the shoulder 162 of the upper stem is moved out of the way of the shaft 184 or 187 which permits the bar 190 to be moved back and the lifting cam 199 to be removed from beneath the floating lever.

However, when a key in only one of the banks of keys is depressed and, as described above, the pawl 224 swings down into the path of the notch 227 after the upper stem has moved upwardly and the shoulder 162 no longer holds the shaft 184 or 187 forward, the bar 190 is maintained in its forward position and the lifting cam 199 held beneath the floating lever by the engagement of the pawl 224 in the notch 227. If the first key depressed is a pennies key, the spring on the latch 174 acting against the finger 216 moves the slide 214 forwardly to achieve the same result, i. e., the prevention of operation when a key in only one of the banks of keys is depressed.

*Price indicating means*

The key mechanism which has been disclosed operates in such a way that the keys corresponding to the price of merchandise being weighed on the scale do not remain depressed and, therefore, there is no indication on the keyboard as to the price which is set up in the factoring mechanism of the scale. It is also necessary to provide an indication so that the merchant will have a visible means of determining whether the scale is set for weighing or for pricing merchandise.

A pair of slides 235 and 236 (Figs. X and XI) are slidably mounted parallel to the tube 189 in slots cut in two brackets 237 which are fastened to the end frame members 186 and extend downwardly therefrom. The two slides are parallel, one of them being located beneath the shoulders 167 of each of the banks of price keys 150 and 151 (Fig. XII). The slide 235 has ten upstanding stops 238, each of which is associated with one of the series of keys 150 which represent cents amounts. The slide 136 has a similar series of stops 239 which are associated with the series of keys 151 representing dimes values of prices.

A bar 240 (Figs. X, XI, XV and XVI) is mounted on the right end of the shafts 184 and 187 similar to the manner in which the bar 190 is secured to their opposite ends. The bar 240 is adapted to be reciprocated by the movement of either of the shafts 184 or 187 caused by the action of the cams 166 of the price keys. A slot 241 (Figs. XI and XV) is milled in the rear end of the bar 240 and the rounded end of an arm 242 of a bell crank 243 is engaged in the slot 241. The bell crank 243 comprises the arm 242, which is secured on a vertical shaft 244, freely mounted in the arms of a U shaped clip 245 which is attached to the end frame member of the mechanism, and a long arm 246 which is secured to the lower end of the shaft 244. A hole 247 in the end of the arm 246 is loosely engaged on a pin 248 which extends upwardly from the center of a horizontal equalizer bar 249. The two ends of the equalizer bar 249 extend through slots 250 in the ends of the two slides 235 and 236.

When either of the shafts 184 or 187 is cammed forward upon depression of any one of the keys, i. e., either one of the price keys or the weight key 204, the bar 240 is moved forward, swinging the bell crank 243 in a counterclockwise direction (Fig. XI) and, by means of the equalizer bar 249, moving the slides 235 and 236 to the right (Figs. X and XI).

A cable 251 is attached to the left end of the slide 235 and then enters a sheave 252 (Figs. XXI and XXIV) which is mounted for rotation on a horizontal plane on a bracket 253 secured to the base 11. The cable 251 then passes through a sheave 254 which is journaled for rotation in a vertical plane in a bracket 255 secured to an ear of the sector guide bracket 128. The cable then extends upwardly and is connected to a yoke 256 which is riveted to the ends of two price indicia ribbons 257 and 258 (see also Figs. XXVI and XXX).

A second cable 259 is attached to the end of the slide 236 (Fig. XI) and passes through a sheave 260 secured in the bracket 253 and a sheave 261 journaled in the bracket 255 from which it extends upwardly and is secured to the end of a single price indicia ribbon 262 located between the price indicia ribbons 257 and 258. The three price indicia ribbons 257, 258 and 262 are parallelly mounted upon two sets of rollers 263 and 264 (XXIV) which are journaled in two sets upon parallel horizontal shafts. The ribbons pass over the top of the rollers and their ends opposite the connections with the cables 251 and 259 are hooked to a pair of springs 265 which are in turn engaged in an arm 266 attached to the underside of a frame 267 supporting the shafts on which the rollers 263 and 264 are journaled. The frame 267 is mounted on an arm 268 (Fig. XXV) attached to an indication bracket 269 which is, in turn, bolted to the upper end of the sector guide bracket 128.

When the bar 240 is cammed forward, and the two slides 235 and 236 are moved to the right (Fig. XI) by the equalizer bar 249, the two cables 251 and 259 pull on the yoke 256 and the end of the ribbon 262 against the tension of the springs 265. After the keys which cammed the shafts 184 and 187 forward have been released and their upper stems have snapped upwardly permitting the shafts to be restored to their normal position, the bar 240 moves back and through the bell crank 243 allows the equalizer bar 249 and slides 235 and 236 to be moved to the left (Fig. XI) by the springs 265 acting through the ribbons and the cables. The slide 235 moves to the left until one of the stops 238 engages the shoulder 167 of the lower stem of that one of the pennies keys which has been depressed (one of the stops 238 is shown so engaged with the shoulder of the lower stem of the "2¢" key in Figs. X and XI). Similarly, the slide 236 slides along until the proper one of the stops 239 engages the shoulder of the lower stem of that one of the dimes keys which has been depressed (one of the shoulders 239 is shown so engaged with the lower stem of the "20¢" key in Figs. X and XI).

The spacing between the stops 238, and similarly between the stops 239, is a fixed amount greater than the spacing between the stems of the row of keys associated with each of the slides. For example, if the distance from the right-hand side of the "2¢" key to the right-hand side of the "3¢" key, or from the "3¢" key to the "4¢" key, etc., is seven-eighths of an inch, the distance from the left-hand side of one of the stops 238 to the left-hand side of the adjacent stop 238 is fifteen-sixteenths of an inch. Thus the slide is permitted to move to the left one-sixteenth of an inch less as its stops 238 successively engage the edges of the lower stems of the pennies value keys.

This can be further understood with reference to Fig. XXX where an enlarged view of the two price indicia ribbons is shown. When the keys are first depressed, and the slides moved completely to the right in Figs. X and XI, the ribbons 257, 258 and 262 are moved downwardly in Fig. XXX until the digits "9" on the ribbons 258 and 262, and similarly on the ribbons 257 and 262, are beneath the area outlined by the dotted lines in that figure. If the "8" pennies key is down, the slide 235 moves to the left in Fig. XI one-sixteenth of an inch which will permit the ribbons 257 and 258 to move up in Fig. XXX a corresponding distance and line up the "8" digits on the ribbons 257 and 258 with the "9" digits on the ribbon 262 in the space outlined by the dotted lines. Successively smaller cents values will permit the ribbons to return successively greater distances and thus the successively smaller indicia on the ribbons will be positioned in the space outlined by the dotted lines. Similarly, the ribbon 262 is moved and controlled by the engagement of the stops 239 with the lower stems of the dimes keys.

When the weight key is depressed, the slides 235 and 236 are permitted to move to the limit of their travel to the left in Fig. XI and the letters "W" on the ribbon 262 and the letters "T" on the ribbons 257 and 258 are moved into position within the space shown by the dotted lines in Fig. XXX to indicate that the scale is weighing.

The space outlined by the dotted lines in Fig. XXX corresponds to a pair of windows 270 (Figs. XXII and XXIII) in a screen 271 which is mounted in a frame 272 (Fig. XXI) supported by a pair of arms 273 which are bolted to the arm 268. The screen 271 is of frosted translucent glass and the windows 270 therein are transparent areas so that the ribbons 258 and 262 may be viewed therethrough. A cylinder lens 274 is mounted in an aperture 275 in the upper part of the housing 10 and is positioned on the sighting line of the screen 271 to magnify the indicia appearing through the windows 270 and further indicia appearing upon the screen itself. A light funnel 276 forms a lens cell extending from the lens to a position just above the face of the screen 271. The windows 270 in the screen 271 are located on the merchant's side of the scale and through them the ribbons 258 and 262 are visible. In Figs. XXIII and XXX the ribbons are shown in the position to indicate a price of 22¢ per pound, the dotted area in Fig. XXX corresponding to the windows 270. A similar screen 271 is similarly mounted in the arms 273 on the customer's side of the scale and has two openings through which the ribbons 262 and 257 are visible. These openings correspond to the second dotted area shown in inverted position in Fig. XXX. A cylinder lens 278 and funnel 279 are mounted in an aperture 280 on the customer's side of the housing 10 and magnify the indicia visible through and on the screen 277.

In Fig. XXII the letters "WT" are shown in the windows 270 and thus indicate that the scale is in weighing condition. Similarly, the letters "W" and "T" on the ribbons 257 and 262 would be visible through the windows in the screen 277.

*Weight and money value indication*

The indication of weight and money value, or the product of price times weight, is derived from a cylindrical chart 281 (Figs. XXI and XXIX) which is mounted on the shaft 148 rotated by the action of the rack 146 and pinion 147 caused by movement of the load counterbalancing pendulum in response to loads being weighed or priced on the scale. The framework of the chart 281 comprises a spider 282 around the rim of which one side of the chart is mounted and a ring 283 on which the other side of the chart is mounted. The peripheral surface of the chart is transparent and bears indicia as shown in Fig. XXIX.

As has been mentioned earlier, the chart carries two series of indicia, one of these being weight indicia 284 and the other being money value indicia 285. These two series of indicia are co-ordinated and associated at the price of 50¢ per pound. Since, in the modification illustrated, indication is also afforded for the customer, the chart also carries two similar sets of indicia 286 for customer's weight and 287 for customer's money value indication.

A lamp 288 is mounted on the lower end of the bracket 269 at the left side (Fig. XXV) of the chart 281. A pair of condensing lenses 289 are secured in an aperture in a subbracket 290 which is bolted to the bracket 269 to condense the light given off by the lamp 288 and focus it on a diagonal mirror 291 which is held by a frame 292 secured to the inside of the bracket 290 and located within the space bounded by the chart 281.

A transversely movable shield 293 (Figs. XXV and XXVII) is located inside the chart 281 and attached to a lens carrier 294 which is movable transversely above the chart in a horizontal carrier frame 295 (Figs. XXVII and XXVIII) which is bolted on the upper end of the subbracket 290. Two apertures 296 in the shield 293 are spaced therein a distance equal to the distance between the peripheral center lines of the rows of indicia 284 and 286 or 285 and 287.

A pair of projecting lenses 297 is carried in apertures in the lens carrier 294, the vertical axes of the lenses 297 being centered in the apertures 296. The lens carrier 294 is adapted to move in the carrier frame 295 transversely across above the chart 281 a distance sufficient to move the two lenses 297 and shield 293 from a price position with the aperture 296 and lenses 297 located below and above the rows of price indicia 285 and 287 to a position with the aperture and lenses located below and above the two rows of weight indicia 284 and 286. The lens carrier 294 has a V groove 298 in each of its longitudinal edges and the carrier frame 295 has a similar groove 299 in the inner edge of each of its side members. Balls 300 are placed in the spaces formed by the two sets of V grooves to afford friction-free movement of the lens carrier 294.

The balls 300 are retained in the grooves by means of staples 301 which project through the carrier frame 295 and into the grooves 299. A spring 302 (Fig. XXVIII) is secured to the carrier frame 295 and engaged with a pin 303 projecting upwardly from the lens carrier 294 to resiliently hold the lens carrier in either of its two correct positions.

The lens carrier 294 is moved from the weight position to the amount position by means of a bell crank 304 which is pivoted in one arm of the carrier frame 295. One of the arms of the bell crank 304 is pivotally connected to the lens carrier 294 and the other arm is linked to the lower end of an actuating lever 305 (Figs. XXV and XXVI) which is pivoted in an ear 306 attached to the arm 266. The upper end of the lever 305 terminates just below the undersurface of the ribbon 262 between the rollers 263 and 264. Two stops 307 and 308 are riveted to the undersurface of the ribbon 262 and adapted to engage the upper end of the actuating lever 305.

When any of the keys, i. e., either the price keys or the weight key are depressed, and the two slides 235 and 236 are moved to the limit of their travel to the right in Figs. X and XI, the ribbons 257, 258 and 262 are all moved to the limit of their travel to the left in Fig. XXVI. The stop 308 engages the upper end of the actuating lever 305, swings it in a counterclockwise direction which, by means of the connection between the lever 305 and bell crank 304, swings the bell crank 304 in a counterclockwise direction (Fig. XXVIII) and moves the lens carrier 294 into the position in which it is shown in Fig. XXVIII. The lenses in this position are located above the rows of money value indicia 285 and 287. If the keys depressed were price keys, when such keys are released the price indicia ribbons return to the right (Fig. XXVI) until the engagement of the stops 238 and 239 with the lower stems of the price keys which were set up. No matter what price is set up, the ribbons do not return far enough for the stop 307 to engage the upper end of the lever 305 and the lens carrier 294 is left in its position with the lenses 297 above the money value indicia.

If the weight key were depressed however, the ribbons would be permitted to return an additional distance sufficient to cause engagement between the stop 307 and the upper end of the actuating lever 305 which would be swung in a clockwise direction (Fig. XXVI), in turn swinging the bell crank 304 in a clockwise direction (Fig. XXVIII) and moving the lenses 297 over the rows of weight indicia 284 and 286.

The light from the lamp 288, which is condensed in the lenses 289, is reflected by the mirror 291 upwardly through the apertures 296 in the shield 293, through the two rows of money value indicia or weight indicia, depending upon the position of the lens carrier 294, through the projecting lenses 297 and against the undersurfaces of a pair of oppositely directed mirrors 309 and 310 which are carried by the lens carrier 294. The mirror 309 is supported at a proper angle to reflect the light carrying the image of the merchant's indicia upwardly and to the right (Fig. XXI) (to the left in Fig. XXVII) and onto the surface of the screen 271 where an image 311 (Fig. XXII) of the indicia appears. In Fig. XXII the image 311 is of the weight indicia and the area of the indicia so projected is shown in Fig. XXIX by the dotted lines.

In Fig. XXIII an image 312 of money value indicia is shown as it would appear to the merchant when merchandise is being priced on the scale and the lenses 297 are positioned above the amount indicia on the chart 281. A reading line 313 is etched on the surface of the screen 271 to cooperate with the indicia projected thereon.

Similarly, the mirror 310 is located above that one of the lenses 297 which is positioned over the customer's weight or money value indicia, and the light carrying this indicia is reflected by the mirror 310 upwardly and to the left (Fig. XXI) (to the right in Fig. XXVII) where it strikes the surface of the customer's screen 277. The customer's indicia is similar in all respects to that afforded to the merchant and has a similar reading line etched in the screen 277.

The embodiment of the invention that has been disclosed may be modified to meet various requirements.

Having described the invention, we claim:

1. In a weighing scale, in combination, a load receiver, a ratio lever supporting said load receiver, automatic force counterbalancing mechanism, indicating means operatively connected to said automatic force counterbalancing mechanism, a factoring lever connected to said automatic force counterbalancing mechanism, and manually operable means for directly link connecting said ratio lever to said factoring lever at selected ones of a plurality of points for applying force created by any load carried by said load receiver to said factoring lever and said automatic force counterbalancing mechanism in proportions determined by said ratio lever and such points of connection so selected.

2. In a weighing scale, in combination, a load receiver, indicating means bearing a series of indicia for weight values and a series of indicia for money values, said indicia for weight values and said indicia for money values being alternatively exhibitable, automatic force counterbalancing means, said indicating means being operatively connected to said automatic force counterbalancing means, a factoring lever permanently connected to said automatic force counterbalancing means, a plurality of keys for selectively applying the force created by any load carried by said load receiver to said factoring lever at a plurality of points, and mechanism operated by said keys for exhibiting that one of said two series of indicia corresponding to the values desired.

3. In a computing weighing scale, in combination, a load receiver, a ratio lever supporting said load receiver, a factoring lever having a plurality of load pivots, loading mechanism connected to an end of said ratio lever for applying force created on said ratio lever by loads carried by said load receiver to selected ones of said load pivots, a plurality of price keys associated with said loading mechanism for selectively operating said loading mechanism, automatic force counterbalancing means operatively connected to said factoring lever, a chart having weight indicia and money value indicia arranged thereon in a selected relationship, weight set-up means for operating said loading mechanism to apply the force applicable thereby to said factoring lever in a relationship corresponding to the relationship between said weight indicia and said money value indicia on said chart, and means operated by said price keys and said weight set-up means for exhibiting that indicia on said chart corresponding thereto.

4. In a computing weighing scale, in combination, a floating ratio lever, a load receiver mounted on said ratio lever, a factoring lever having a plurality of load pivots, loading mechanisms, the ends of said ratio lever each being mounted in one of said loading mechanisms, said ratio lever being arranged to apply a certain portion of the load on said load receiver to each of said loading mechanisms, a price key corresponding to each of said load pivots and adapted to selectively operate one of said loading mechanisms for applying that portion of the total load applied to said loading mechanism by said ratio lever on the corresponding one of said load pivots, automatic load counterbalancing and indicating means operatively connected to said factoring lever, the indications afforded thereby being in money values and in weight values, means operated by said keys for selectively exhibiting said weight values and said money values and a price indication operatively connected to the last said means for showing the value of the operated ones of said price keys.

5. In a computing weighing scale, in combination, indicating means bearing a series of weight indicia and a series of money value indicia, said weight indicia and said money value indicia being associated at a certain price per unit of weight, a factoring lever having a plurality of load pivots arranged in two series and operatively connected to said indicating means, a load supporting mechanism including a ratio lever for applying the load supported thereby in fixed proportions to each of said series of load pivots, a plurality of selectively operable price keys, one corresponding to each of said load pivots and arranged in two groups corresponding to said two series, for applying that proportion of the load applicable to each of said series of load pivots to a selected one of said load pivots in said series, and a weight key for applying all of said load to certain of said load pivots corresponding to such certain price per unit of weight at which said weight indicia and said money value indicia are associated.

6. In a computing weighing scale, in combination, indicating means bearing a series of weight indicia and a series of money value indicia, said weight indicia and said money value indicia being associated at a certain price per unit of weight, a factoring lever having a plurality of load pivots arranged in two series and operatively connected to said indicating means, a load supporting mechanism including a ratio lever for applying the load supported thereby in fixed proportions to each of said series of load pivots, a plurality of selectively operable price keys, one corresponding to each of said load pivots and arranged in two groups corresponding to said two series, for applying that proportion of the load applicable to each of said series of load pivots to a selected one of said load pivots in said series, a weight key for applying all of said load to certain of said load pivots corresponding to such certain price per unit of weight at which said weight indicia and said money value indicia are associated and an indicator operated by said price key and said weight key for indicating the price and operation corresponding to those keys operated.

7. In a computing weighing scale, in combination, indicating means bearing a series of weight indicia and a series of money value indicia, said weight indicia and said money value indicia being associated at a certain price per unit of weight, a factoring lever having a plurality of load pivots arranged in two series and operatively connected to said indicating means, a load supporting mechanism including a ratio lever for applying the load supported thereby in fixed proportions to each of said series of load pivots, a plurality of selectively operable price keys, one corresponding to each of said load pivots and arranged in two groups corresponding to said two series, for applying that proportion of the load applicable to each of said series of load pivots to a selected one of said load pivots in said series, a weight key for applying all of said load to certain of said load pivots corresponding to such certain price per unit of weight at which said weight indicia and said money value indicia are associated, an indicator operated by said price key and said weight key for indicating the price and operation corresponding to those keys operated, and means for exhibiting only said series of money value indicia when said price keys are operated and for exhibiting only said series of weight indicia when said weight key is operated.

8. In a computing weighing scale, in combination, a load receiver, automatic force counterbalancing mechanism with weight and money value indicating means operatively connected thereto, a factoring lever having two series of load pivots, said automatic force counterbalancing mechanism being operatively connected to said factoring lever, a ratio lever supporting said load receiver and having two unequal arms, a loading mechanism supporting each arm of said ratio lever, each of said loading mechanisms being solely supported by a selected pivot in each of said series of load pivots on said factoring lever, a series of manually operable keys for selectively connecting each of said loading mechanisms to a pivot of said series of load pivots cooperating therewith, there being one of said keys corresponding to each of said load pivots, and price indicating mechanism operated by said keys for indicating which of said keys have been operated.

9. In a computing weighing scale, in combination, a load receiver, automatic force counterbalancing mechanism, weight and money value indicating means operatively connected thereto, a factoring lever having two series of load pivots, said automatic force counterbalancing mechanism being operatively connected to said factoring lever, a ratio lever supporting said load receiver and having two unequal arms, a loading mechanism supporting each arm to said ratio lever, one of said loading mechanisms being operatively associated with each of said series of load pivots on said factoring lever and a series of manually operable keys for selectively connecting each of said loading mechanisms to that one of said series of load pivots associated therewith, there being one of said keys corresponding to each of said load pivots, each of said loading mechanisms comprising a series of connectable linkages engaged with said load pivots, a pivot engageable in each one of said linkages, that one of said keys associated with each of said load pivots being operable to engage one of said pivots in that one of said linkages engageable with said pivot and a latch for holding said pivots in engagement in said linkages, the operation of one of said keys first operating said latch to release any of said pivots previously engaged before engaging that one of said pivots associated therewith.

10. In a computing weighting scale, in combination, a load receiver, automatic force counterbalancing mechanism with weight and money value indicating means operatively connected thereto, a factoring lever having two series of load pivots, said automatic force counterbalancing mechanism being operatively connected to said factoring lever, a ratio lever supporting said load receiver and having two unequal arms, a loading mechanism supporting each arm of said ratio lever, one of said loading mechanisms being operatively associated with each of said series of load pivots on said factoring lever, each of said loading mechanisms being adapted to pivotally link connect said ratio lever to said load pivot on said factoring lever, a series of manually operable keys for selectively connecting each of said loading mechanisms to that one of said series of load pivots cooperating therewith, there being one of said keys corresponding to each of said load pivots, and price indicating mechanism operated by said keys for indicating which of said keys have been operated, said price indicating mechanism including a slide associated with each of said series of keys and movable in a plane at right angles to the direction of movement of said keys and a member connected to each of said slides and bearing indicia corresponding to the values of that series of keys associated with said slide, each of said slides being movable a different distance for each of said keys to exhibit the corresponding indicium on that one of said members associated therewith.

11. In a computing weighing scale, in combination, a lever fulcrumed at one of its ends, automatic force counterbalancing mechanism operatively connected to said lever, a plurality of load pivots on said lever, a load receiver, a ratio lever supporting said load receiver, said ratio lever having two uneven arms, a plurality of price keys arranged in two series, the value of such two series being arranged in a ratio equal to the ratio between said uneven arms of said ratio lever, a loading mechanism supporting each end of said ratio lever, each of said loading mechanisms being adapted to be selectively connected to one of said load pivots by one of said price keys, a weight key for connecting said loading mechanisms to predetermined ones of said load pivots, and indicating means operatively connected to said automatic force counterbalancing mechanism, said indicating means having a series of money value indicia and a series of weight indicia, said two series of indicia being associated at a price per pound equal to that represented by such predetermined ones of said load pivots to which said loading mechanisms are connected by said weight key.

12. In a computing weighing scale, in combination, a lever having a fixed fulcrum and a plurality of load pivots arranged in two series, the load pivots in each series being spaced progressively greater distances from said fulcrum, automatic force counterbalancing mechanism operatively connected to said lever, a load receiver, a ratio lever for supporting said load receiver, a loading mechanism associated with each series of said load pivots, said loading mechanisms supporting said ratio lever, manually operable means, including a keyboard having a plurality of keys arranged in two series corresponding to said series of load pivots, each of said keys corresponding to one of said load pivots, for connecting each of said loading mechanisms to any one of said load pivots in that series of load pivots associated with said loading mechanism, a latch in each of said loading mechanisms operable by depression of any of said keys associated therewith for releasing all previously made connections between said loading mechanism and its associated load pivots and for making and securing the connection between said loading mechanism and that one of said load pivots corresponding to the depressed one of said keys, and linkage operable upon depression of any one of said keys for locking and supporting said ratio lever and loading mechanisms during the period subsequent to the release of such previous connections and prior to the making of a new connection.

13. In a computing weighing scale, in combination, a lever having a plurality of load pivots, automatic force counterbalancing mechanism operatively connected to said lever, load receiving mechanism adapted to be selectively connected to each of said load pivots and manually operable means for connecting said load receiver to each of said load pivots including a key corresponding to each of said load pivots, the depression of each of said keys operating to directly link connect said load receiving mechanism to and support said load receiving mechanism from that one of said load pivots corresponding to said key, said keys being grouped in two banks representing pennies and dimes increments of prices, and a latch associated with each of said banks of keys operable upon depression of any key in said bank for latching said keys in depressed position and for releasing any previously depressed keys before latching a newly depressed key in position.

14. In a computing weighing scale, in combination, a lever having a plurality of load pivots arranged in two series, one of said series representing pennies increments of prices and the other of said series representing dimes increments of prices, automatic force counterbalancing mechanism operatively connected to said lever, indicating means connected to said automatic force counterbalancing mechanism, said indicating means bearing a series of money value indicia and a series of weight indicia, said two series of indicia being associated at a predetermined price per pound, a load receiver, means for applying a proportional amount of the force created by loads on said load receiver to any one of said load pivots in either of said two series of load pivots, the ratio between the proportional amounts applicable to each series being equal to the ratio between the price increments represented by said series, said force applying means including a plurality of price keys arranged in two banks associated with said two series of load pivots, each of said keys corresponding to one of said pivots and representing a value of from one to nine times the increment of price represented by that series of load pivots associated with that bank of keys including said key, an additional key in each bank representing zero increments of price and a single weight key associated with those of said load pivots representing increments of price equal to that price per pound at which said two series of indicia are associated on said indicating means, the depression of any one of said keys acting to apply that proportion of force applicable to each series of load pivots to that one of said series of load pivots representing the number of increments of price equal to the value represented by said key whereby said lever factors such force by such value producing resultant force counterbalanced by said automatic force counterbalancing mechanism for moving said indicating means to a position to indicate money values equal to the product of the load on said load receiver multiplied by the value of the depressed ones of said keys, weight being indicated by said weight indicia when said single weight key is depressed, and means operated by the depression of said price keys to exhibit said money value indicia and by the depression of said weight key to exhibit said weight indicia.

15. In a factoring weighing scale, in combination, a transparent chart bearing a series of weight indicia and a series of money value indicia associated with said weight indicia at a selected price per pound, a plurality of operating keys for actuating said scale, certain of said keys representing increments of prices per pound and one of said keys being operable to set up that price per pound at which said two series of indicia are associated, a source of light, a screen projection means shiftable in accordance with the operation of said keys for projecting an image of either of said series of indicia onto said screen, the operation of any of said price increment keys shifting said projection means to project said series of money value indicia and the operation of that one of said keys operable to set up that price per pound at which said two series of indicia are associated, shifting said projection means to project said series of weight indicia, and other means actuated by operation of said keys for indicating which of said keys have been operated.

CHARLES O. MARSHALL.
LAWRENCE S. WILLIAMS.